United States Patent
Suda et al.

(10) Patent No.: US 8,063,971 B2
(45) Date of Patent: Nov. 22, 2011

(54) IMAGE CAPTURE APPARATUS WITH OPTICAL FINDER

(75) Inventors: Yasuo Suda, Yokohama (JP); Makoto Oikawa, Yokohama (JP); Jun Terashima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 12/529,491

(22) PCT Filed: May 21, 2007

(86) PCT No.: PCT/JP2007/060744
§ 371 (c)(1),
(2), (4) Date: Sep. 1, 2009

(87) PCT Pub. No.: WO2008/117479
PCT Pub. Date: Oct. 2, 2008

(65) Prior Publication Data
US 2010/0103305 A1   Apr. 29, 2010

(30) Foreign Application Priority Data
Mar. 23, 2007   (JP) .................................. 2007-077555

(51) Int. Cl.
*H04N 5/222* (2006.01)
(52) U.S. Cl. .............................. 348/333.09; 348/333.02
(58) Field of Classification Search . 348/333.01–333.05
See application file for complete search history.

(56) References Cited

U.S. PATENT DOCUMENTS

| | | | |
|---|---|---|---|
| 5,161,025 A | 11/1992 | Nakao | |
| 5,612,732 A * | 3/1997 | Yuyama et al. | 348/14.01 |
| 7,239,350 B2 | 7/2007 | Ban | |
| 7,382,410 B2 * | 6/2008 | Togino | 348/333.07 |
| 7,656,429 B2 * | 2/2010 | Larson | 348/208.14 |
| 2004/0201741 A1 | 10/2004 | Ban | |
| 2005/0000583 A1 | 1/2005 | Masui et al. | |
| 2006/0001757 A1 | 1/2006 | Sawachi | |
| 2006/0044401 A1 * | 3/2006 | Park | 348/207.99 |
| 2006/0174206 A1 | 8/2006 | Jung et al. | |
| 2006/0207290 A1 * | 9/2006 | Ide et al. | 65/27 |
| 2010/0003025 A1 * | 1/2010 | Oikawa | 396/374 |

FOREIGN PATENT DOCUMENTS

JP   61-234668 A   10/1986
(Continued)

OTHER PUBLICATIONS

Human English Translation of JP 09-046559 (1997), provided with IDS filed May 20, 2010.*
The above reference was cited in a Apr. 29, 2010 European Search Report which is enclosed of the counterpart European Patent Application No. 07744178.0.

(Continued)

*Primary Examiner* — David Ometz
*Assistant Examiner* — Dillon Durnford Geszvain
(74) *Attorney, Agent, or Firm* — Cowan, Liebowitz & Latman, P.C.

(57) ABSTRACT

A first display region for displaying an optical image of an object and a second display region for displaying information are provided for a finder device. The first display region and the second display region can be observed at the same time through an eyepiece window. On the second display region, an electric image that is photoelectrically converted by an image pickup element is displayed. That reduces failures to take a shutter chance and enables a state of the captured image and auxiliary information to be checked.

11 Claims, 24 Drawing Sheets

| | FOREIGN PATENT DOCUMENTS | | |
|----|----|----|----|
| JP | 06-282004 | A | 10/1994 |
| JP | 09-046559 | A | 2/1997 |
| JP | 09046559 | A * | 2/1997 |
| JP | 2002-023245 | A | 1/2002 |
| JP | 2002-281356 | A | 9/2002 |
| JP | 2003-078785 | A | 3/2003 |
| JP | 2004-357123 | A | 12/2004 |

OTHER PUBLICATIONS

Human English Translation of JP 61-234668, cited in a May 20, 2010 IDS, (1986).
Human English Translation of JP 09-046559, cited in a May 20, 2010 IDS, (1997).

* cited by examiner

IMAGE CAPTURE APPARATUS WITH OPTICAL FINDER

CROSS-REFERENCE TO RELATED APPLICATIONS

This application is a national stage application of International Application No. PCT/JP2007/060744, filed May 21, 2007, whose benefit is claimed and which claims the benefit of Japanese Patent Application No. 2007-077555, filed Mar. 23, 2007, whose benefit is also claimed.

TECHNICAL FIELD

The present invention relates to an image capture apparatus having an optical finder for picking up a digital image.

BACKGROUND ART

As this type of image capture apparatus, a camera having an optical finder and a digital finder that can be switched therebetween and enabling a user to easily check a reproduced image without changing the user's posture when taking an image, has been known (for example, see Japanese Patent Application Laid-Open No. 2004-357123). The camera has a first finder system for optically directing an object image passed through a photographing lens into a finder, and a second finder system for digitally directing an object image into a finder through an image pickup element and a display device into a finder. The camera also has a finder switching section for switching a valid state of both of the finders. The camera also has a mode switching section for switching a recording mode and a reproduction mode, and a control section for switching both of the modes.

In the camera, when the control section switches from the recording mode to the reproduction mode, the finder switching section forcibly switches the finder system into a valid state of the second finder system. When the control section returns the switched mode to the record mode again, the finder switching section automatically returns to the finder system that was valid in the original recording mode.

A camera that enables a user to recognize the proportion of a calculated appropriate exposure value and exposure values before and after the calculation on the capturing screen only by looking into a finder is also known (for example, see Japanese Patent Application Laid-Open No. H06-282004). The camera is adapted to indicate an object image on a focusing screen in the finder, and also indicate such exposure conditions as a luminance distribution of the object, a shutter speed and an iris on a display device nearby. The camera divides the object image into a two-dimensional lattice, measures luminance for each square, and processes the luminance in a CPU therein. Then, the camera displays the number of squares with luminance appropriate for the designed exposure conditions on the center, the number of squares with higher luminance on the right side, and the number of squares with low luminance on the left side of the display device as a histogram.

The image capture apparatus however has problems below. In the camera described in Japanese Patent Application Laid-Open No. 2004-357123, only the first finder that optically directs the object image through the photographing lens into a finder and the second finder that digitally directs the object to the finder through the image pickup element and the display device are simply switched, when the mode is switched into the reproduction mode. Therefore, when the second finder is used, a user cannot observe the object image and sometimes fails to take a good shutter chance.

In the camera described in Japanese Patent Application Laid-Open No. H06-282004, a user can check a proportion of a calculated appropriate exposure value and exposure values before and after the calculation on the capturing screen through a finder, but not various conditions required for taking a good photograph. For example, the user cannot check such conditions as whether an appropriate white balance are set or not, whether the object is well focused or not, whether a composition does not match an intended composition as a result of vibration proof of the image pickup element or not. Nor the user checks such conditions as whether a foreign matter such as a dust is on an optical low-path filer or not and whether the color mode is unexpectedly set to the monotone mode or not while the user wishes to take a color photograph.

DISCLOSURE OF THE INVENTION

The present invention is adapted in view of the abovementioned problems and provides an image capture apparatus for enabling a user to check a state of the photographed image and auxiliary information without missing a chance for a good shot.

The present invention in its first provides the image capture apparatus including an image pickup element for photoelectrically converting an subject image formed by the photographing lens, and a finder device for effecting display so that a first display region on which the subject image is observed as an optical image and a second display region on which a digital image that is photoelectrically converted by the image pickup element and is displayed by a display unit is observed, can be observed simultaneously through an eyepiece window.

Further features of the present invention will become apparent from the following description of exemplary embodiments with reference to the attached drawings.

BRIEF DESCRIPTION OF THE DRAWING

FIG. 18 is a diagram illustrating a display screen of the LCD 308a;

BEST MODES FOR CARRYING OUT THE INVENTION

Exemplary embodiments of the present invention will be described with reference to the drawings.

First Embodiment

The digital single lens reflex camera of the embodiment is a still camera for capturing an object image (subject image) with an image pickup element such as a CMOS or CCD. On the digital single lens reflex camera, a release button for indicating to start the image pickup operation is provided on an exterior casing of the camera. The camera also has a serial image pickup mode (a continuous photographing mode) as an image capturing mode, in which an image capture operation is repeated while the release button is pressed. The camera is adapted to repeat an image capture operation of photoelectrically converting an object image (a subject image) into a digital image by withdrawing an object image observing movable mirror from an image capturing optical path to the outside thereof, while the release button is operated when the continuous photographing mode is selected.

Figure 1:
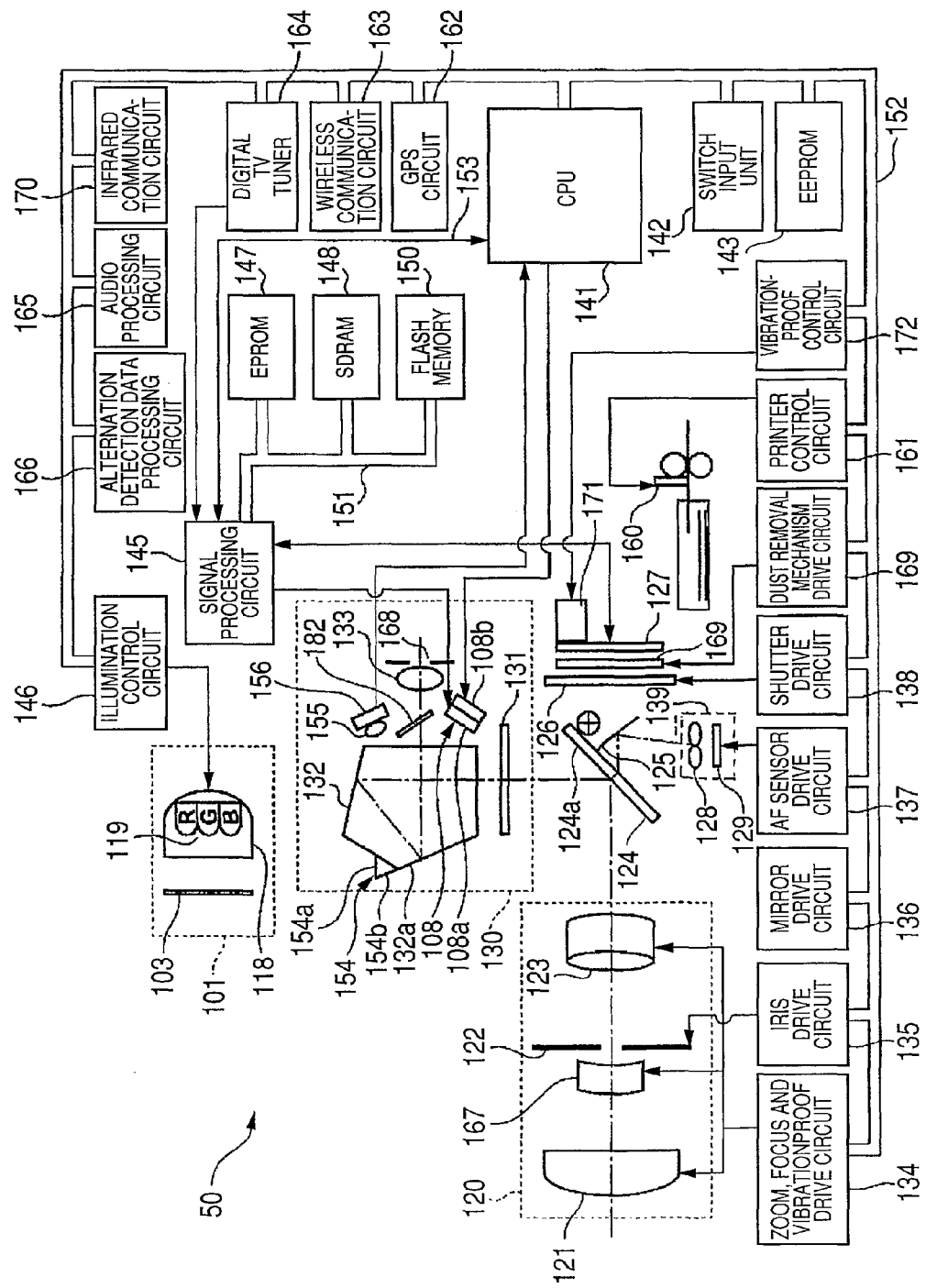
FIG. 1 is a diagram illustrating an outlined configuration of an electric circuit of a digital single lens reflex camera in the first embodiment.

FIG. 1 is a diagram illustrating an outlined configuration of an electric circuit of a digital single lens reflex camera in the first embodiment. The digital single lens reflex camera 50 includes a CPU 141 for controlling over an operational sequence of the entire camera, a lighting unit 101, a photographing lens 120, a movable mirror 124, a shutter 126 and an image pickup element 127. The image pickup element 127 has a rectangular image capture section with an aspect ration of 3:2.

The digital single lens reflex camera 50 includes a finder device 130, a focus detecting device 139, a built-in printer 160, a zoom/focus/vibrationproof circuit 134, an iris driving circuit 135, a mirror driving circuit 136, and an AF sensor driving circuit 137.

The digital single lens reflex camera 50 includes a shutter driving circuit 138, a dust removing mechanism driving circuit 169, a printer control circuit 161, an image pickup element vibrationproof control circuit 172, a GPS circuit 162, a wireless communication circuit 163, and a digital television tuner 164. The printer control circuit 161 controls a built-in printer 160. The image pickup element vibrationproof control circuit 172 cancels vibration of an image by moving the image pickup element 127. The GPS circuit 162 measures the position of the camera.

The digital single lens reflex camera 50 includes an infrared communication circuit 170, an audio processing circuit 165, and an image alteration detecting data processing circuit 166. The infrared communication circuit 170 communicates with a cellular phone or the like with a comparatively little amount of data. The audio processing circuit 165 includes a microphone and a speaker.

The digital single lens reflex camera 50 has a switch input section 142, an EEPROM 143, a signal processing circuit 145, a lighting control circuit 146, an EPROM 147, an SDRAM 148 and a flash memory 150.

The photographing lens 120 includes a plurality of groups of lenses 121, 167 123, with an iris mechanism 122 provided between the groups. The groups of lenses 121, 167, and 123 are driven by a zoom/focus/vibrationproof circuit 134. The iris mechanism (simply referred to an iris) 122 is driven by an iris driving circuit 135.

Behind the groups of lenses 121, 167, and 123, a movable mirror 124 is provided. The movable mirror 124 is formed by a half mirror and a holding mechanism thereof, and can freely move to a first position of the mirror down position and a second position of the mirror up position. At exposure moment (at shooting), the movable mirror 124 jumps up from the first position to the second position of the mirror up position in the direction of the focusing screen 131 as it is revolving around the fixed axis 124a to withdraw from the photographing optical path. On the backside of the central part of the movable mirror 124, a sub-mirror 125 formed by a concave mirror is provided so as to reflect an object image toward the bottom of the drawing.

Below the reflection optical axis of the sub-mirror 125, a refocusing optical system 128 for dividing an image with two lenses is provided, and at the position of focusing an object image by the refocusing optical system 128, an AF sensor 129 is provided. To the AF sensor 129, the AF sensor driving circuit 137 is connected.

The sub-mirror 125, the refocusing optical system 128 and the AF sensor 129 form a focus detecting device 139. The focus detecting device 139 detects a focusing state of an object at a plurality of positions on the image pickup element 127 in a well known phase difference detecting method.

The zoom/focus/vibrationproof circuit 134 is formed by a driving source such as a conventional electromagnetic motor and a supersonic motor, a driver circuit for controlling the driving sources and an encoder device for detecting the position of a lens. With the zoom control and the focus control, the positions of the groups of lenses 121, 167, and 123 in the direction of an optical axis is controlled. With the vibrationproof, the position of the group of lenses 167 in the direction of the group intersecting an optical axis is controlled.

On the refection optical axis of the movable mirror 124, a finder optical system is provided. The finder optical system includes the focusing screen 131, a penta prism 132 formed by an optical glass, an eyepiece lens 133 and the like. The finder device 130 is formed by the finder optical system added with a liquid crystal display device 108, prism 154, a photometry lens 155 and a photometry sensor 156.

An object light (incident light) transmitted through the groups of lenses 121, 167, 123 of the photographing lens 120 is reflected on the movable mirror 124 and forms an image on the focusing screen 131. An observer recognizes an optical object image (optical image) formed on the focusing screen 131 though a single eyepiece window 168 via the penta prism 132 and the eyepiece lens 133. An advantage in observing the optical image is that no temporal delay Occurs.

The photometry sensor 156 is sensor for photometry for brightness of an object image on the focusing screen 131 via the photometry lens 155. The photometry sensor 156 is provided with the photometry lens 155 at the position on a photometry axis that is decentered from an observing optical axis of the eyepiece lens 133 in the finder device 130. The photometry sensor 156 is formed by a photodiode having a light receiving surface that is divided into a plurality of parts. The CPU 141 performs calculation on a luminance output that is individually output from the photodiode of the photometry sensor 156 according to the distance measurement position on the focusing screen 131 by the focus detecting device 139. Then, the CPU 141 obtains object luminance information (a BV value) for performing exposure control from the result.

The shutter 126, the dust removing mechanism driving circuit 169 and the image pickup element 127 including a CCD and a CMOS imager are provided behind the movable mirror 124.

The shutter 126 is driven by the shutter driving circuit 138 to open for a predetermined seconds for directing an object image into the image pickup element 127. The movable mirror 124 is driven by the mirror driving circuit 136 and rises to the second position, withdrawing from the optical axis of the photographing lens 120, and the shutter 126 is driven by the shutter driving circuit 138 to be in the open state. Accordingly, the object light is directed onto the light receiving surface of the image pickup element 127 to perform an image-pickup procedure. Here, an image pickup element vibrationproof mechanism 171 connected to the image pickup element vibrationproof control circuit 172 shifts and rotates the image pickup element 127 in the direction to cancel shakes of the image so as to prevent the resolution of the image from being lost as the image rolls.

The image pickup element vibrationproof mechanism 171 is near to the image pickup element 127 than to the dividing position of the optical path to the finder device 130, thus, the observer cannot check any change in the composition due to shifting or rotating of the image pickup element 127, through the finder device 130.

The dust removing mechanism driving circuit 169 mechanically vibrates an optical low-path filer or an infrared cut-off filter to accelerate foreign matters on them and let the power generated thereon shake off the foreign matters.

To the CPU 141 formed by a microprocessor, the zoom/focus/vibrationproof drive circuit 134, the iris drive circuit 135, the mirror driving circuit 136, the AF sensor driving circuit 137 and the dust removing mechanism driving circuit 169 are connected via a data bus 152. To the CPU 141, the shutter driving circuit 138, the printer control circuit 161, the image pickup element vibrationproof control circuit 172, the GPS circuit 162, the wireless communication circuit 163, the digital television tuner 164 and the infrared communication circuit 170 are also connected via the data bus 150. To the CPU 141, the audio processing circuit 165 described above, the image alteration detecting data processing circuit 166 and the lighting control circuit 146 are also connected via the data bus 152. To the CPU 141, the switch input section 142 and the EEPROM 143, which is a nonvolatile memory, are also connected via the data bus 152.

The switch input section 142 has a first release switch that is turned on in response to half depression of the release button (not shown), which is provided on the exterior casing of the camera, and a second release switch that is turned on in response to full depression of the same release button. The switch input section 142 has a plurality of switches including a switch that operates in response to the power switch of the camera and a mode switch that operates in response to various mode buttons on the camera. The switch input section 142 supplies operational signals based on an operation on any switch to the CPU 141.

The EEPROM 143 is a nonvolatile semiconductor memory. EEPROM 143 stores adjustment values for each camera body required to limit variations for respective cameras in the production before they are shipped. The EEPROM 143 stores factors and the like representing relationship between the BV value and the amount of the backlight for the CPU 141 to define the amount of light of the backlight 108b based on output from the photometry sensor 156, described below.

When the first release switch is turned on, the CPU 141 controls the AF sensor driving circuit 137 for calculating a distance between two images on the AF sensor 129 and controls the zoom/focus/vibrationproof circuit 134 for adjusting the focus of the photographing lens 120.

When the second release switch is turned on, the CPU 141 controls the mirror driving circuit 136 to withdraw the movable mirror 124 from the optical axis to the second position. The CPU 141 obtains an appropriate narrowing-down value, a shutter second time and sensitivity of the image pickup element in accordance with object luminance information based on the output from the photometry sensor 156, while performing the withdrawing control. The CPU 141 drives the iris mechanism 122 with the obtained narrowing-down value via the iris drive circuit 135. The CPU 141 drives the shutter 126 with the obtained shutter second time via the shutter driving circuit 138.

The CPU 141 decides the amount of electric current electricity supplied to the backlight 108b by referring to factors indicating relationship between the BV value and the amount of the backlight stored in the EEPROM 143 and obtains the amount of light appropriate for visual checking.

When an object image is formed on the light receiving surface of the image pickup element 127 by an opening operation of the shutter 126, the object image is converted into analog image signals, and further converted into digital image signals in the signal processing circuit 145.

The signal processing circuit 145 includes an RISC processor, a color processor, and a JPEG processor therein and performs compression/decompression, white balance processing or edge enhancement processing on the digital image signals. The signal processing circuit 145 performs converting processing into a composite signal (luminance signal, color difference signal) output from the liquid crystal display device 108.

The CPU 141 and the signal processing circuit 145 are connected to each other by a communication line 153. A control signal such as a capturing timing of an image signal or a data is sent and received via the communication line 153.

The composite signal generated by the signal processing circuit 145 is output to the liquid crystal display device 108 in the finder device 130 and a digital object image is displayed.

The liquid crystal display device 108 is provided between the penta prism 132 and the eyepiece lens 133. The liquid crystal display device 108 includes the LCD (liquid crystal device) 108a, which is a display element for displaying a color image, and the backlight 108b for lighting the display surface of the LCD 108a from behind. For the backlight 108b, a white LED is used, for example.

To the penta prism 132, the prism 154 is fixed by adhesive with an index matching. The prism 154 has a surface 154b, which is extended from a third reflecting surface 132a (see FIG. 3), and the same refractive index as that of the penta prism 132. The light emitted from the liquid crystal display device 108 is reflected twice inside the prism 154 and directed toward the eyepiece lens 133. Here, the display surface of the LCD 108a of the liquid crystal display device 108 is positioned at the position optically equivalent to that of the focusing screen 131 by curvature of a surface 154a. Whether the movable mirror 124 is at the first position or the second position, the image displayed on the LCD 108a can be observed through the eyepiece window 168. The brightness of the image displayed on the LCD 108a is adjusted to an appropriate brightness by changing the current amount to be supplied to a white LED, which is the backlight 108b.

The signal processing circuit 145 is connected to the EPROM 147, SDRAM (synchronous dynamic random access memory) 148 and the flash memory 150 via the data bus 151.

The EPROM 147 stores a program that is processed by the processor (CPU) included in the signal processing circuit 145. The SDRAM 148 is a volatile memory for temporally storing an image data before image processing and an image data under image processing. The flash memory 150 is a nonvolatile memory for storing a finally determined image data. The SDRAM 148 can perform rapid operation, but once the power supply stops, the stored contents are gone. On the other hand, the flash memory 150 performs slow operation, and even if the camera is powered off, the stored contents are stored.

The lighting unit 101 includes an emitting panel 103, a reflector 118, and high luminance LEDs 119 for each color of RGB. The light emitted from the high luminance LED directly passes through the emitting panel 103 or is reflected on the reflector 118 and passes through the emitting panel 103 to be incident on the object. When the lighting unit 101 is detached from the camera body, an inner battery (not shown) functions the wireless communication circuit. That is, the lighting unit 101 is adapted to communicate with the camera body (camera 50) via the wireless communication circuit 163 according to the UWB standard, being available for remote control from the camera body. The lighting control circuit 146 decides the balance among the amounts of light of RGB colors and controls an emitting command to the high luminance LEDs 119 under the control of the CPU 141.

Figure 2:
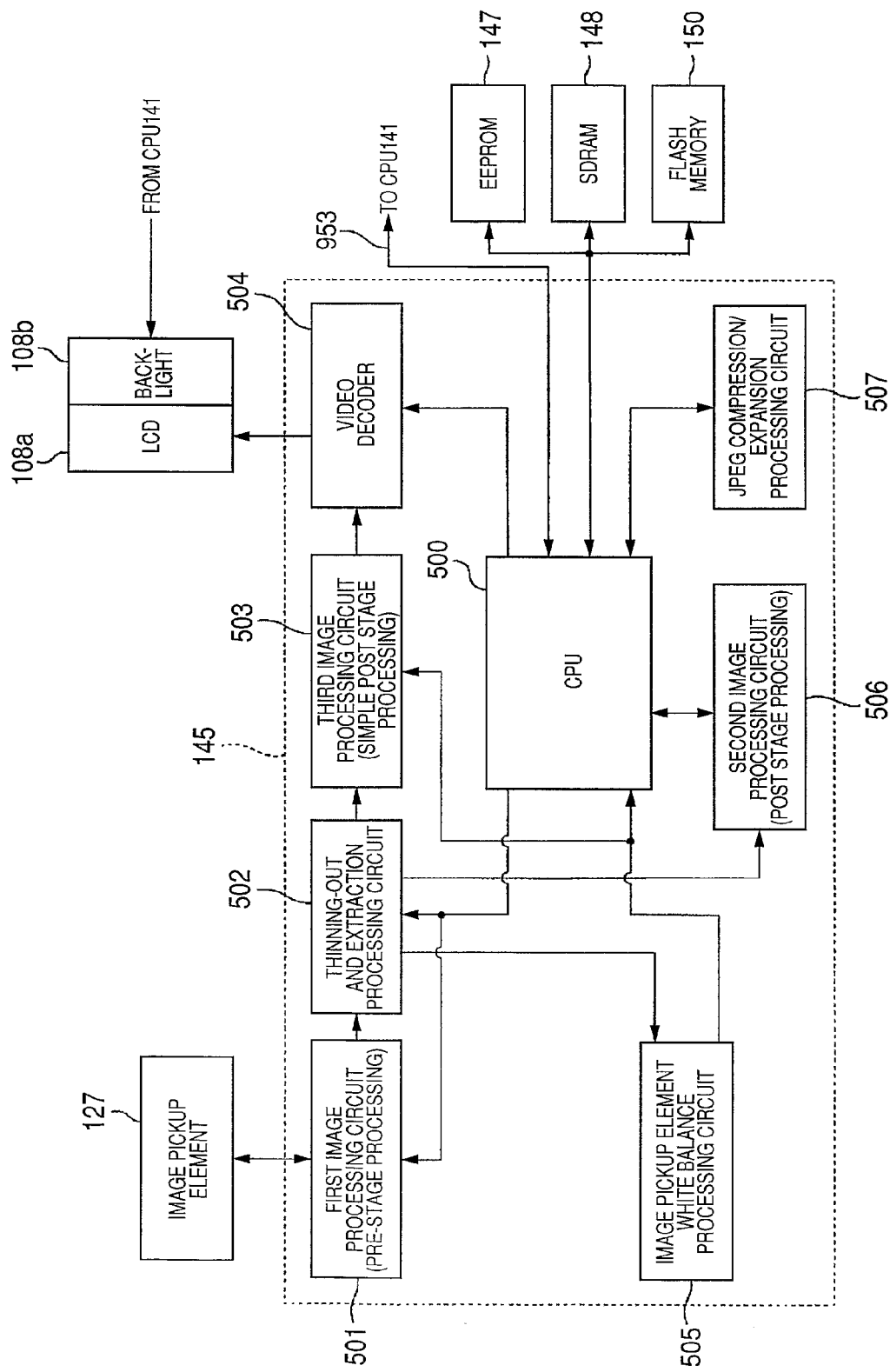
FIG. 2 is a block diagram illustrating a configuration of the electric circuit of signal processing circuit 145 and peripheral circuits connected thereto.

FIG. 2 is a block diagram illustrating a configuration of the electric circuit of signal processing circuit 145 and peripheral circuits connected thereto. The signal processing circuit 145 includes a CPU 500 as a control circuit for controlling a signal processing operation and a plurality of circuits connected to the CPU 500 for operating according to a control signal from the CPU 500. The CPU 500 is connected with the CPU 141, which is for controlling a camera sequence, via the communication line 153 and controls each circuit in the signal processing circuit 145 according to the control signal sent from the CPU 141. In the signal processing circuit 145, a first image processing circuit 501, a thinning-out/extracting processing circuit 502, a second image processing circuit 506 and a third image processing circuit 503 are provided as a plurality of circuits. In the signal processing circuit 145, a video decoder 504, a white balance processing circuit 505, and a JPEG compression/decompression processing circuit 507 are provided.

The first image processing circuit 501 is a former stage processing circuit for generating a digital image signal by driving the image pickup element 127 according to the conditions set at the CPU 500 and performing A/D converting on the analog image signal output from the image pickup element 127. The first image processing circuit 501 corrects the digital image signal based on a pixel signal of a light-shield portion of the image pickup element 127.

The thinning-out/extracting processing circuit 502 thins out the digital image signals output from the first image processing circuit 501 and outputs them to the second image processing circuit 506 and the third image processing circuit 503. Here, the thinning-out processing is processing for reducing resolution. The digital image signal output to the third image processing circuit 503 is a signal of a digital object image displayed on the liquid crystal display device 108.

Here, how much the digital image signals to be outputted to the second image processing circuit 506 are thinned out is instructed by the CPU 500 according to the resolution set by a user. How much the digital image signals to be outputted to the third image processing circuit 503 are thinned out is instructed by the CPU 500 so that it has the resolution appropriate for the image display.

The thinning-out/extracting processing circuit 502 extracts a part of the digital image signals and outputs the part to the white balance processing circuit (hereinafter referred to WB processing circuit) 505. The method for extracting the digital image signal is instructed by the CPU 141.

The WB processing circuit 505 is a circuit for outputting white balance information (WB information) for adjusting the color balance (white balance) of the image. The WB information is directly sent to the third image processing circuit 503 and sent to the second image processing circuit 506 via the CPU 141.

The third image processing circuit 503 is a circuit for generating an image to be displayed on the liquid crystal display device 108. The third image processing circuit 503 performs a well known processing such as gamma correction, reduction of the number of data bits, color adjustment based on the WB information and conversion from the RGB signal to YcbCr signal on the digital image signal as simple latter processing stage. Generally, when a captured image is repeatedly displayed on the liquid crystal display device 108, processing by software cannot catch up that speed, frequently. Therefore, all of the image processing for display is processed in the third image processing circuit 503 in a hardware manner.

The video decoder 504 forms a digital object image by converting YcbCr signals forming the digital image signals into NTSC signals and displays the digital object image on the LCD 108a of the liquid crystal display device 108. The display surface of the LCD 108a is lit from behind with the amount of light defined in the CPU 141 with the backlight 108b.

The second image processing circuit 506 is a circuit for generating the digital image signal to be stored in the flash memory 150. The second image processing circuit 506 performs a well known processing such as gamma correction, reduction of the number of data bits, color adjustment based on the WB information, conversion from the RGB signal to YcbCr signal, defective pixel correction of the image pickup element 127, smear correction, hue and chromaticity as the latter processing circuit.

The JPEG compression/decompression processing circuit 507 performs JPEG compression when the digital image signals processed at the second image processing circuit 506 are stored in the flash memory 150. The JPEG compression/decompression processing circuit 507 reads out and decompresses the JPEG image stored in the flash memory 150.

Figure 3:
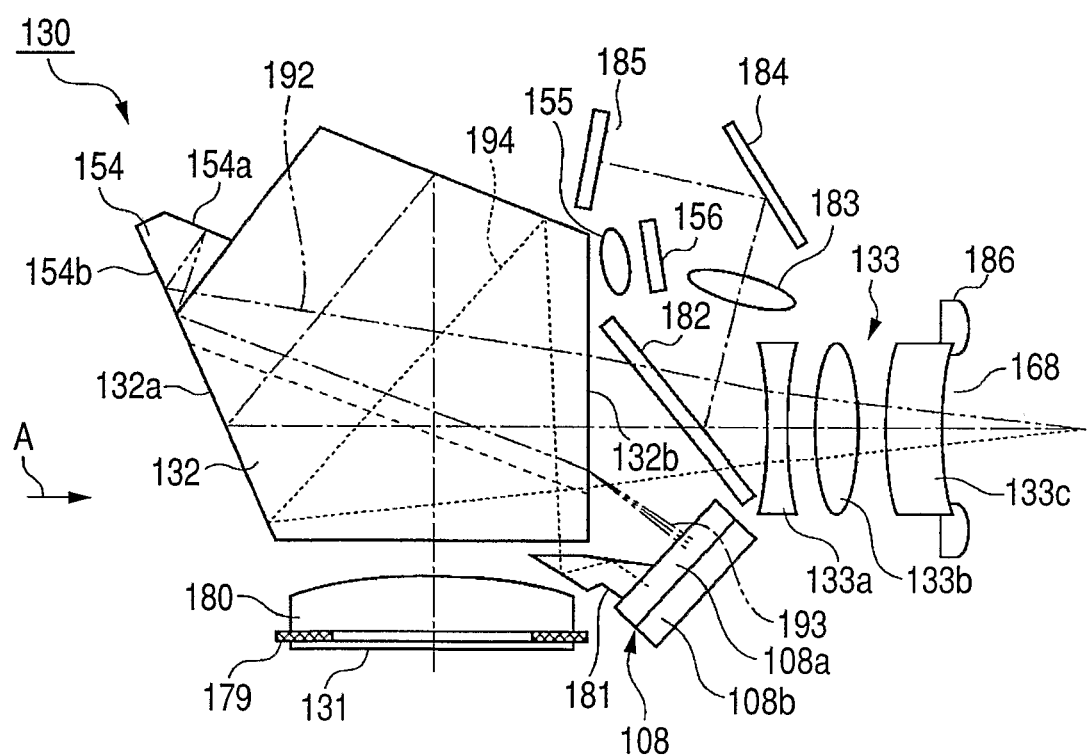
FIG. 3 is a cross-sectional diagram illustrating a configuration of the finder device 130.
Figure 4:
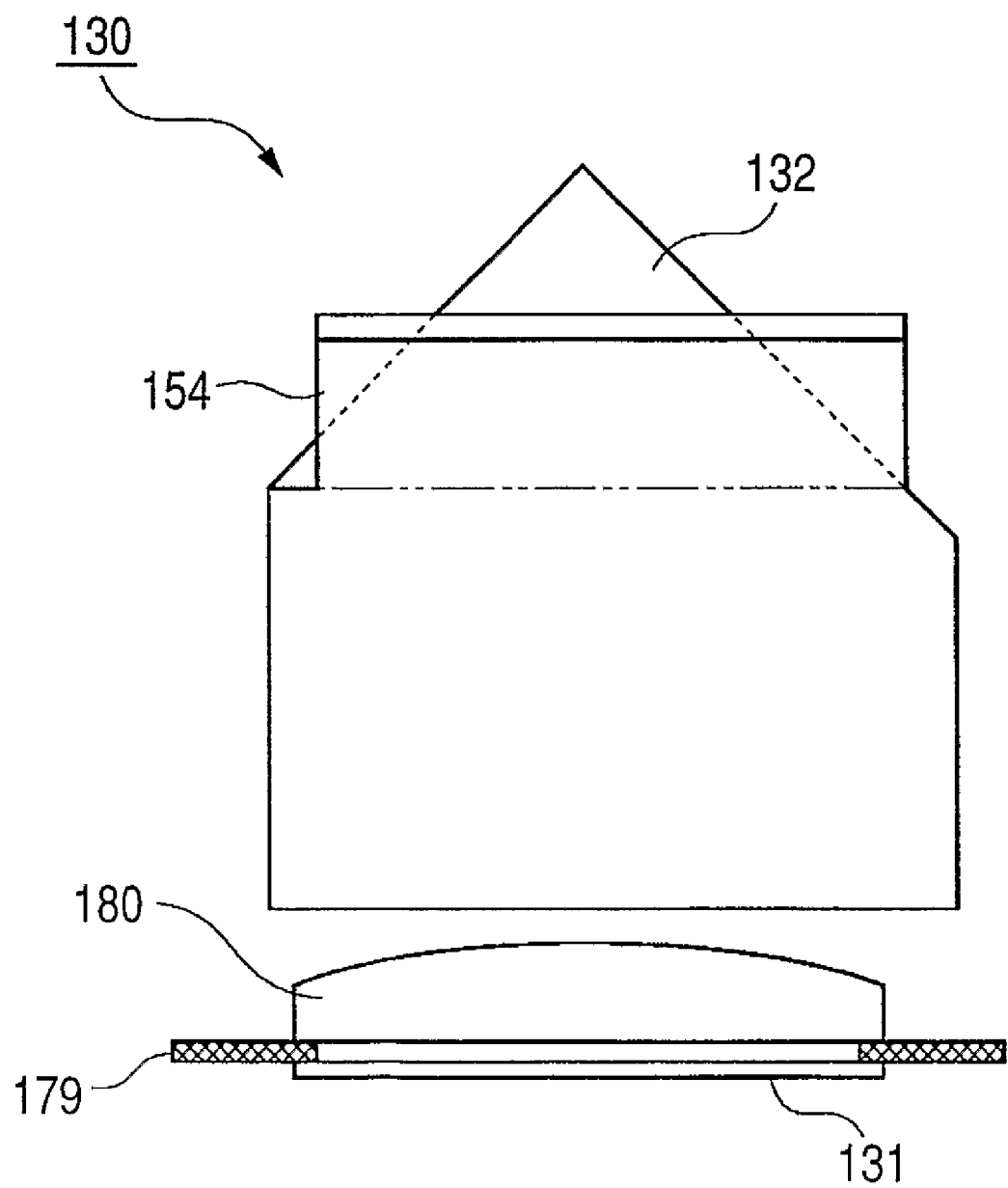
FIG. 4 is a side view illustrating a configuration of the finder device 130 viewed in the direction of the arrow A in FIG. 3.

FIG. 3 is a cross-sectional diagram illustrating a configuration of the finder device 130. FIG. 4 is a side view illustrating a configuration of the finder device 130 viewed in the direction of the arrow A in FIG. 3. On the optical path that is reflected and branched at the movable mirror 124 shown in FIG. 1, the direction of the focusing screen 131, a condenser lens 180 and the penta prism 132 are provided. The object light formed on the focusing screen 131 by the groups of lenses 121, 167, 123 of the photographing lens 120 transmits through the condenser lens 180 and the penta prism 132 and ejected from the surface 132b toward the eyepiece window 168 surrounded by an eyecup 186. Here, the object light transmits through a dichroic mirror 182 and reaches the eyes of the observer who is looking into the eyepiece window 168 through the eyepiece lens 133 formed by three lenses 133a, 133b, 133c as it is protected by the eyecup 186 and refocused on the observer's retina.

The dichroic mirror 182 reflects the light emitted from an organic EL display element 185 and transmitted through the mirror 184 and a diopter adjusting lens 183 toward the eyepiece window 168. A field of view mask 179 has a rectangular aperture indicating a range of an object image to be captured by the image pickup element 127. A finder observer can watch distance measurement position information 197 (see FIG. 8) of the focus detecting device 139 indicated on the organic EL display element 185 superimposed on the object image in the field of view mask 179.

Figure 5:
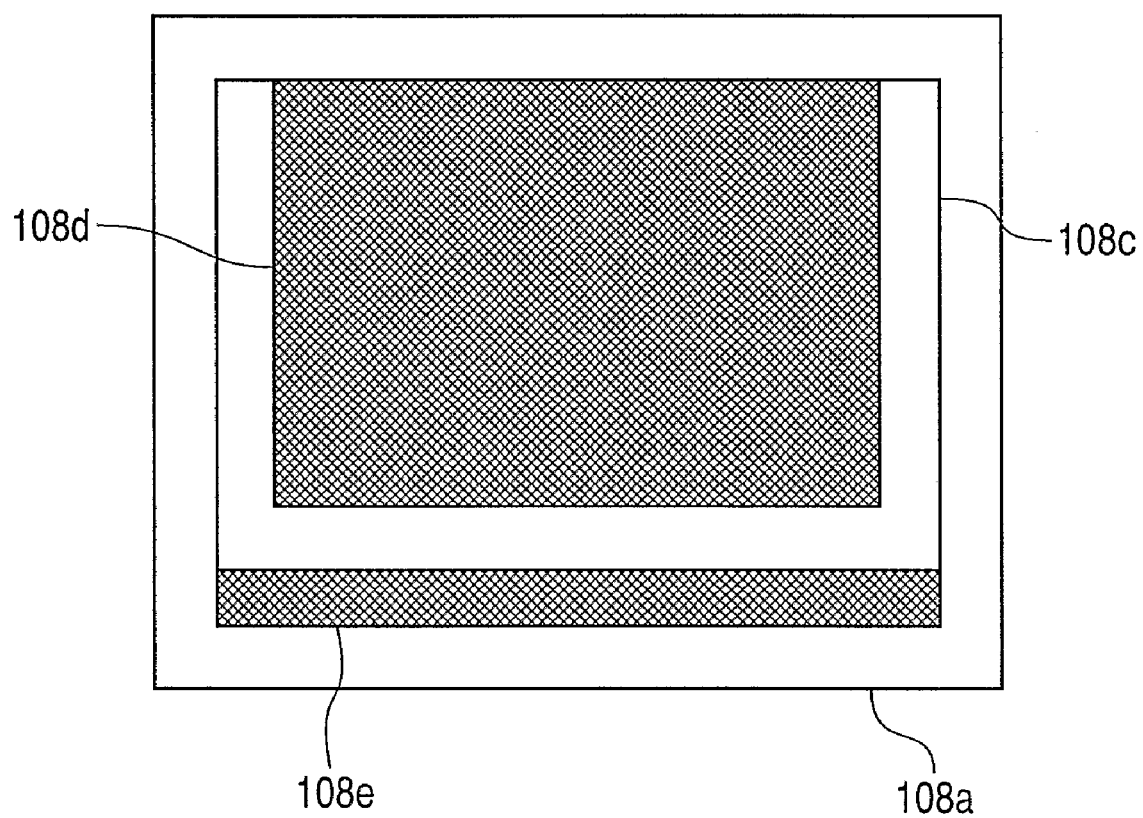
FIG. 5 is a diagram illustrating a screen of a LCD 108*a* on the liquid crystal display device.

FIG. 5 is a diagram illustrating a screen of a LCD 108a on the liquid crystal display device. The LCD 108a of the liquid crystal display device 108 has a color display section 108c with the aspect ratio of 4:3. The display section 108c supplies a LCD display region 108d with the same aspect ratio of 3:2 as that of the image pickup element 127 and a plane horizontally long LCD display region 108e to the digital image display in the field of finder view respectively.

The light emitted from the LCD display region 108d of the LCD 108a is incident into the penta prism 132 from the surface 132d of the penta prism 132. The light incident into the penta prism 132 is referred to as the light 192. The light 192 is refracted here and changes its direction, and incident on the surface 132a next. On the surface 132a, silver deposition is performed. The light 192 is reflected here, and incident into the prism 154 that is fixed on the penta prism 132 by adhesive. The light 192 is reflected on the surface 154a, on which the silver deposition is performed, again, then returns on the surface 154b of the prism 154, on which silver deposition is performed, and further reflected there. The surface 154b is next to the surface 132b of the penta prism 132. Then, the light 192 is ejected from the surface 132b of the penta prism 132 toward the eyepiece window 168.

With such a configuration of a reflection optical path in the prism 154, an optical path length from the eyepiece lens 133 to the LCD display region 108d approaches that from the eyepiece lens 133 to the focusing screen 131. The diopter of the LCD display region 108d and the diopter of the focusing screen 131 almost match.

With curvature given to the surface 154a of the prism 154, the diopter of the LCD display region 108d and the diopter of the focusing screen 131 more strictly match. If the surface 154a is plane, the curvature of the surface 154a may be slight as both of the diopters almost match. The reflection optical path of the surface 154a is decentered, but degradation of optical aberration may be ignorable.

Figure 6:
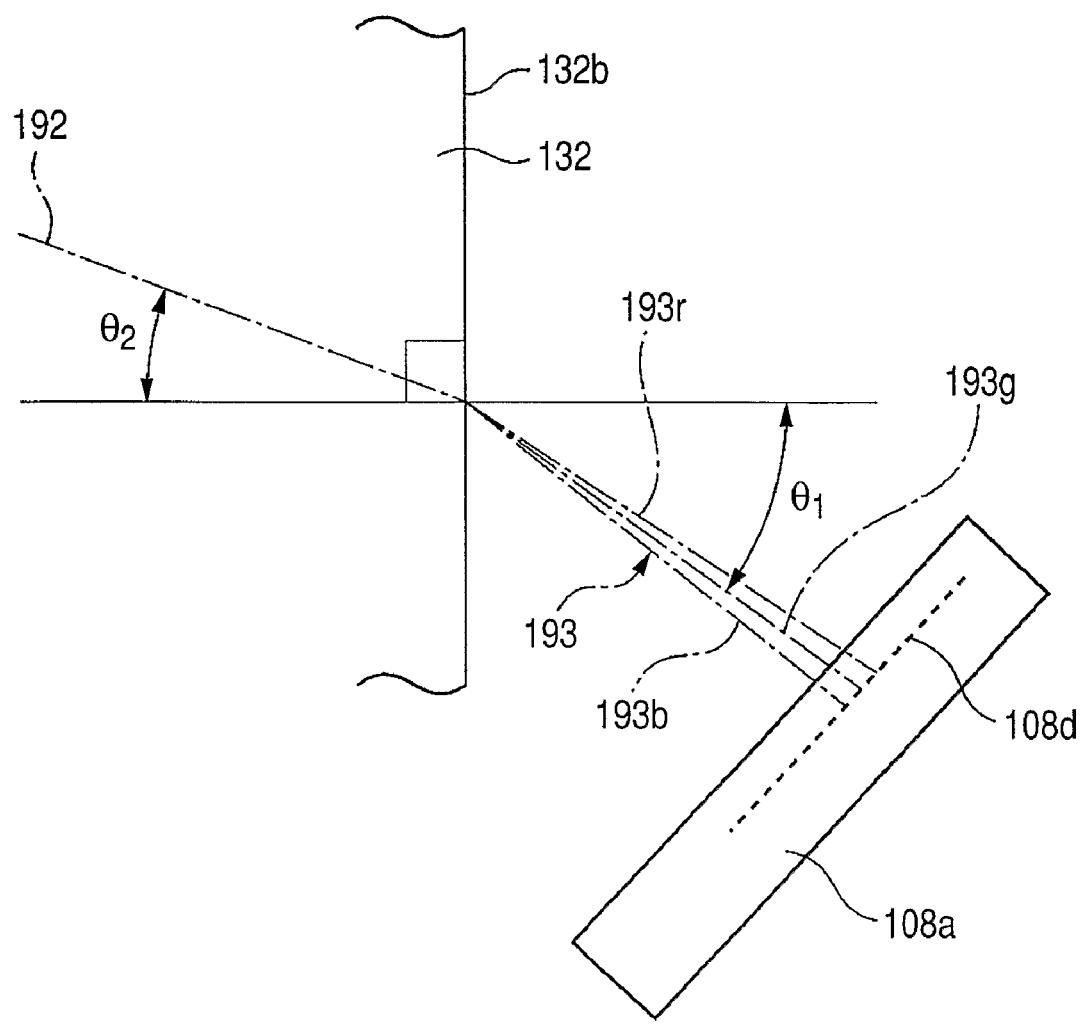
FIG. 6 is a diagram illustrating a state of light incident on the penta prism 132.

FIG. 6 is a diagram illustrating a state of light incident on the penta prism 132. A green light 193g among the light emitted from the LCD display region 108d of the LCD 108a is diagonally incident on the surface 132b of the penta prism 132 at the angle $\theta 1$, refracted at an interface between the air and the glass, and travels inside the penta prism 132 at the angle $\theta 2$. With the color dispersion of the refractive index of the glass, relationship between the angle $\theta 1$ and the angle $\theta 2$ depends on the wavelength of the light. Thus, in such a case, if the LCD display region 108d is supplied to the digital image display, color blur in the vertical direction occurs to make the image with worse resolution. Thus, on the digital image displayed on the LCD display region 108d, an RGB image is previously shifted by the amount of a position difference caused by the color dispersion.

Figure 7:
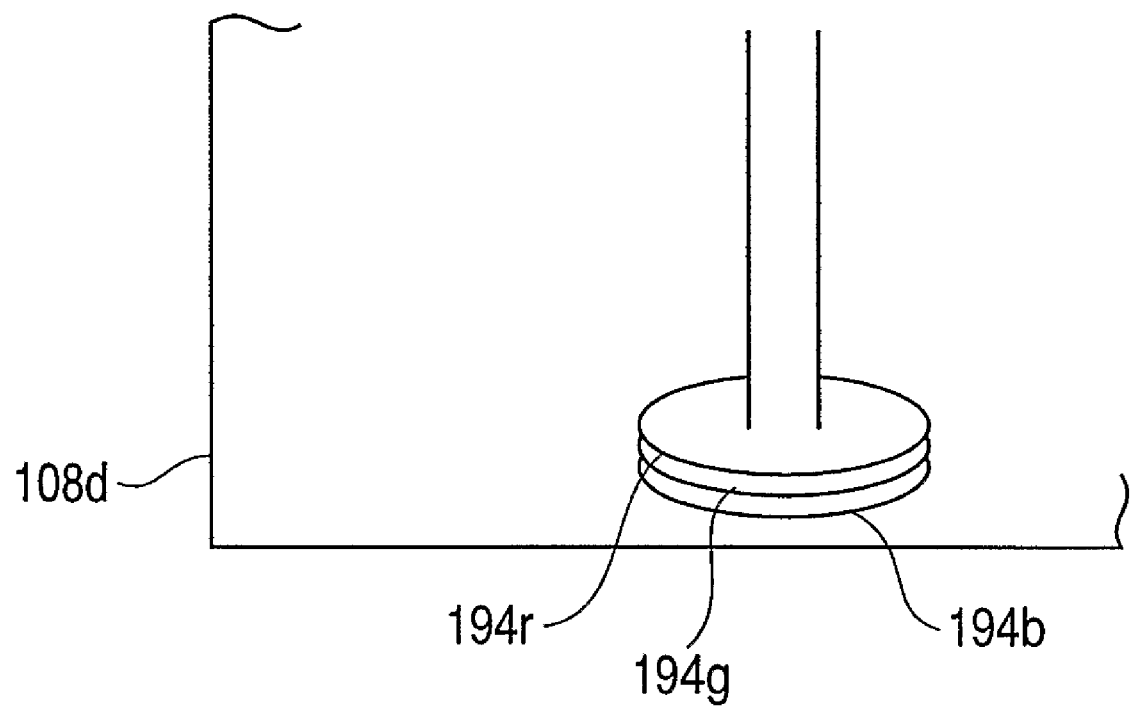
FIG. 7 is a diagram illustrating a positional difference of a digital image displayed on the LCD display region 108*d*.

FIG. 7 is a diagram illustrating a position difference state of a digital image displayed on the LCD display region 108d. On the LCD display region 108d, a red digital image 194r, a green digital image 194g and a blue digital image 194b displace vertically. Accordingly, lights 193r, 193g, and 193b emitted from the positions corresponding to the red digital image 194r, the green digital image 194g and the blue digital image 194b travel in the penta prism 132 as a single light as shown in FIG. 6. Then, the light 192 finally reaches the eyes of the observer with its color blur being almost gone.

A light 194 (see FIG. 3) emitted from the display region 108e of the LCD 108 is incident into the penta prism 132 from the bottom of the penta prism 132 through a light guiding prism 181, and is reflected inside the penta prism 132 as an object light and emitted from the surface 132b.

Figure 8:
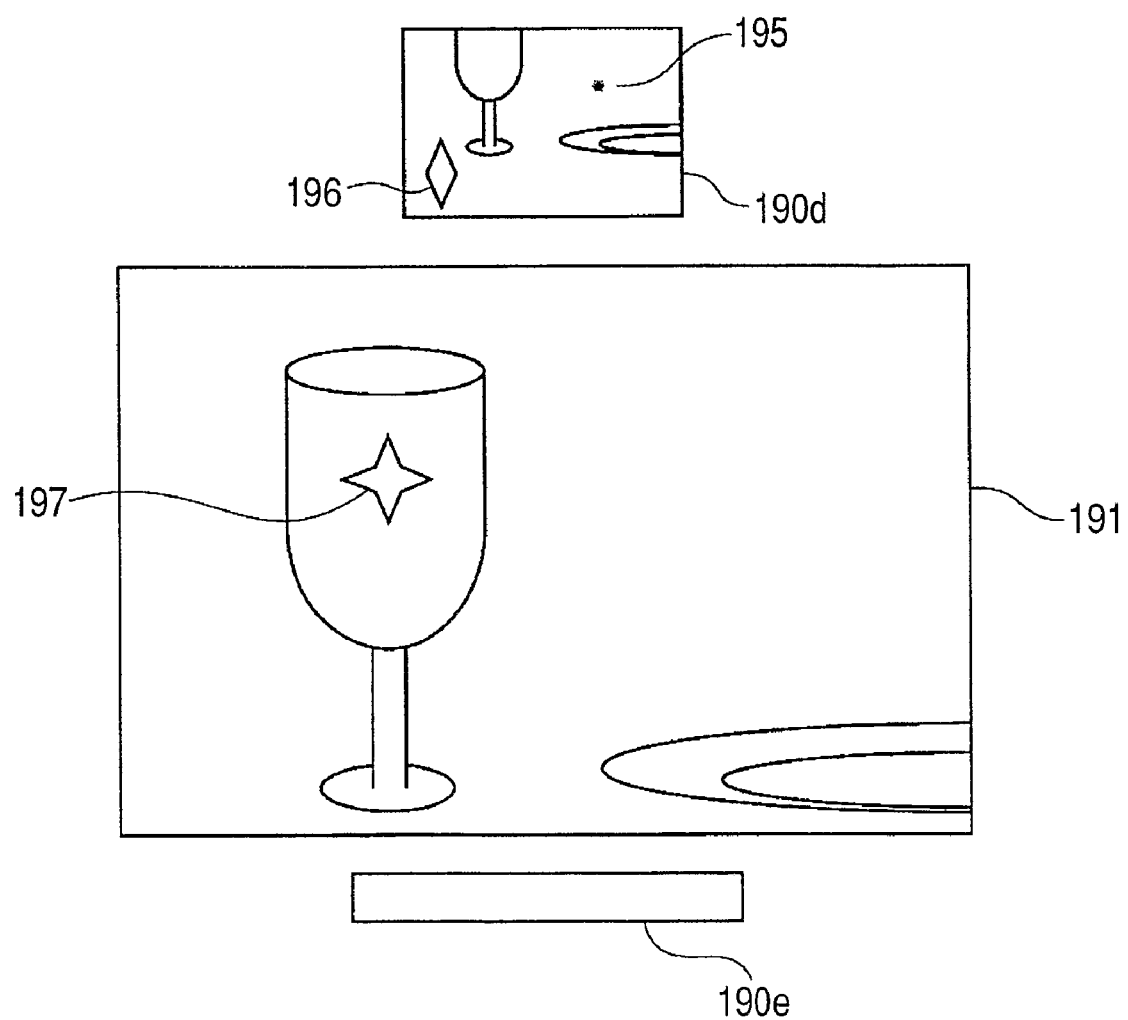
FIG. 8 is a diagram illustrating a display in the field of the finder view.

FIG. 8 is a diagram illustrating a display in the field of the finder view. The display inside the field of the finder view includes a first display region 191, a second display region 190d, a third display region 190e and the distance measurement position information 197. The first display region 191 displays an optical image of an object defined by the aperture of the distance measurement position information 197. The second display region 190d is above the first display region 191 and displays information with an image based on the LCD display region 108 of the LCD 108a. The third display region 190e is below the first display region 191 and displays information with a character string or an icon based on the LCD display region 108e of the LCD 108a. The distance measurement position information 197 is inside the first display region 191 and displayed by the organic EL display element 185. Here, display luminance of each of the second display region 190d, the third display region 190e and the distance measurement position information 197 is controlled to a value appropriate to be visually recognized based on output from the photometry device including the photometry sensor 156 and the photometry lens 155.

A digital image displayed on the second display region 190d in FIG. 8 is an image captured at the time before as one of the information display. According to the digital image, it is apparent that a black spot 195 is present as an image of a foreign matter staying on the optical low-path filer is captured. It is also apparent that operation of the image pickup element vibrationproof mechanism 171 makes it an unexpected image such that the upper part of the subject is lost in the composition of the object image. In addition, it is apparent that an appropriate white balance is set, that an image is not shaken, and that the object is well focused.

By displaying a predetermined mark corresponding to an attribute of the image and the image at the same time, information added to the image can be represented. For example, a mark 196 in the diamond shape shown in FIG. 8 indicates that an image alteration detecting data is suitably added to the image captured at the time before by the image alteration detecting data processing circuit 166. If an image captured by another camera is displayed, the image alteration detecting determination may be indicated with another mark.

Although the liquid crystal display device 108 is used in the embodiment, an organic EL display device may be used instead. In such a case, the backlight 108b is not needed.

Figure 9:
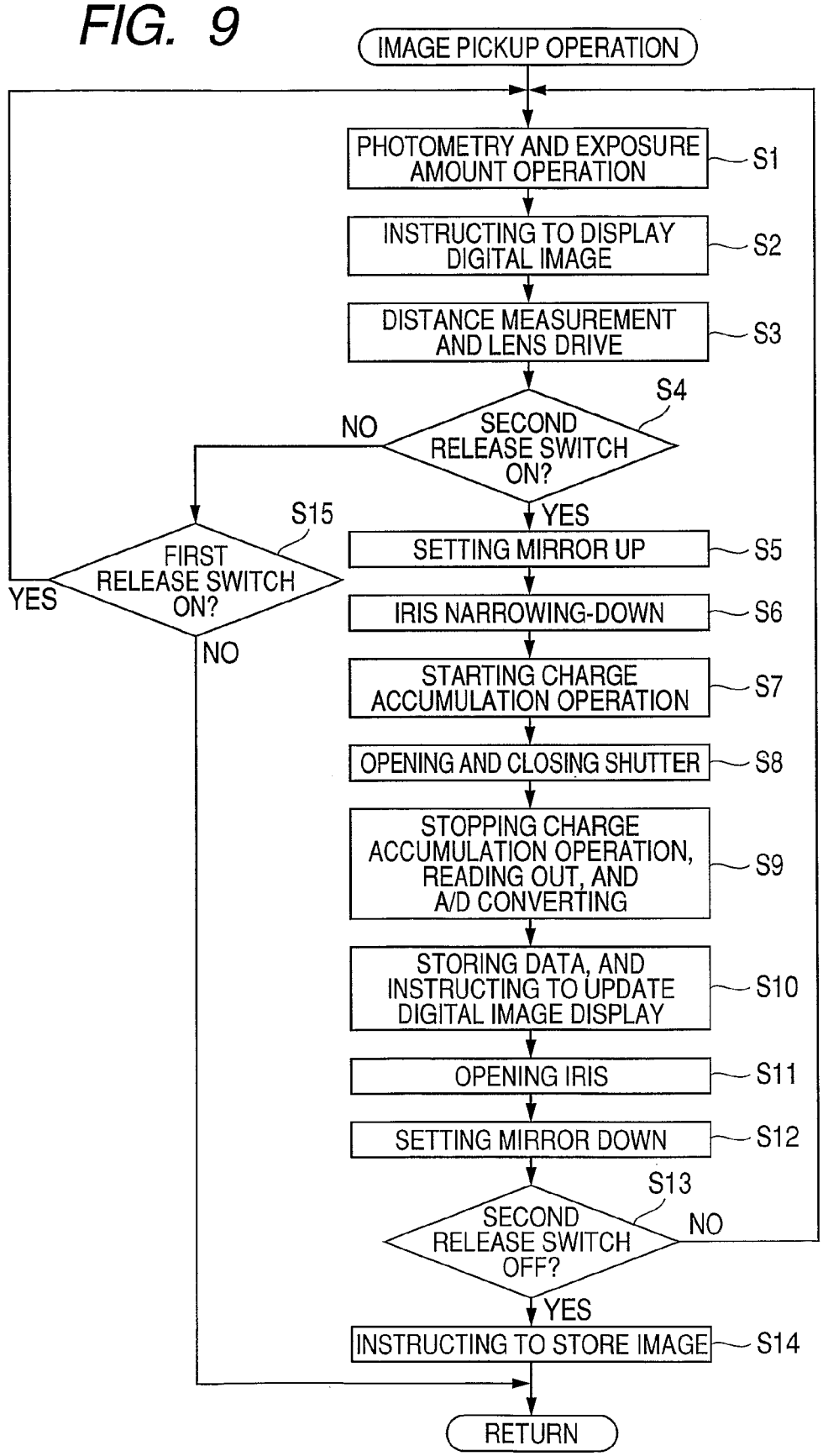
FIG. 9 is a flowchart illustrating an image-pickup procedure performed after half depression is performed on the release button of the switch input section 142 in the digital single lens reflex camera.

An operational sequence of the CPU 141 is shown in the digital single lens reflex camera with the abovementioned configuration. FIG. 9 is a flowchart illustrating an image-pickup procedure after half depression operation (first release-on operation) is performed on the release button of the switch input section 142 in the digital single lens reflex camera. This flowchart is a subroutine called in the main flowchart of the CPU 141. As the main flowchart of the CPU 141 is a conventional well known technique, it will be omitted from the description here.

First, the CPU 141 drives the photometry sensor 156 via the photometry lens 155, performs photometry and measures luminance of the object by using output from the photometry sensor 156 (step S1). The CPU 141 calculates the exposure amount (narrowing-down amount of the iris mechanism 122, a shutter speed of the shutter 126 and the sensitivity of the image pickup element) from the luminance information according to a predetermined calculation program.

The CPU 141 reads out the image data (digital image signal) written at the time before from the flash memory 150, and sends out a control signal to instruct the second display region 190d of the finder device 130 to display the digital image to the signal processing circuit 145 (step S2). When the signal processing circuit 145 receives the control signal, it temporarily stores the digital image signal in the SDRAM 148, while converting the image data into composite signals. The signal processing circuit 145 supplies the composite signals into the liquid crystal display device 108 and causes the LCD 108a to display the captured digital image. As a result, the digital image captured at the time before is displayed on the second display region 190d of the finder device 130. If the digital image has been already displayed, the signal processing circuit 145 lets image display to be continued as it is.

The CPU 141 adjusts the amount of light of the backlight 108b by changing the amount of current supplied to the while LED that forms the backlight 108b. The CPU 141 lights the digital object image displayed on the LCD 108a with the amount of light appropriate for visual recognition based on the object luminance (luminance information) that was obtained by photometry before capturing the image.

The CPU 141 drives the AF sensor 129 via the AF sensor driving circuit 137 and measures the defocus amount (distance measurement) of the photographing lens 120 (step S3). The CPU 141 further performs a focusing operation of the groups of lenses 121, 167, 123 based on the distance measurement.

Then, the CPU 141 determines whether a camera operator performed full depression on the release button or not, i.e., whether the second release switch connected with the switch input section 142 is turned on or not (step S4).

If the second release switch is not turned on, the CPU 141 determines whether the camera operator performed half depression on the release button or not, i.e., whether the first release switch is turned on or not (step S15). If the first release button is turned on, the CPU 141 determines that half depression is performed on the release button and returns to processing at step S1. On the other hand, if the first release switch is not turned on, it can be considered that the camera operator removes the user's finger from the release button, thus, the CPU 141 returns to the main routine shown in the main flowchart.

On the other hand, if the second release switch is turned on at step S4, the CPU 141 determines that the full depression is performed on the release button and withdraws the movable mirror 124 from the first position to the second position that is outside the image capturing optical path via mirror driving circuit 136 (step S5). The CPU 141 performs a mirror up at step S5, and then performs a narrowing-down operation of the iris mechanism 122 via the focus detecting device driving circuit 135 based on the narrowing-down amount calculated at step S1 (step S6).

The CPU 141 sends out a signal for instructing to start image capturing to the signal processing circuit 145 (step S7). When the signal processing circuit 145 receives the signal, it starts a charge accumulation operation of the image pickup element 127. The CPU 141 opens or closes the shutter 126 based on the shutter speed calculated at step S1 (step S8).

After closed the shutter 126, the CPU 141 sends out a signal for instructing to stop image capturing to the signal processing circuit 145 (step S9). When the signal processing circuit 145 receives the signal, it ends the charge accumulation operation at the image pickup element 127. Then, the signal processing circuit 145 reads out an image signal from the image pickup element 127, performs analog-digital (A/D) conversion and performs processing to convert it into the digital image signal and image processing along with the conversion.

The CPU 141 sends out a control signal to instruct to store and display the digital image signal to the signal processing circuit 145 (step S10). When the signal processing circuit 145 receives the signal, it temporarily stores the digital image signal in a continuous photographing data storage region of the SDRAM 148 in order, while converting the data into the composite signal. The signal processing circuit 145 supplies the composite signal to the liquid crystal display device 108 and displays the captured digital image to the LCD 108a. As a result, the digital image is displayed in the second display region 190d of the finder device 130. Here, the CPU 141 adjusts the amount of light of the backlight 108b by changing the amount of current supplied to the white LED that forms the backlight 108b. Then, the CPU 141 lights the digital object image displayed on the LCD 108a with the amount of light appropriate for visual checking based on the object luminance that is obtained by photometry before capturing the image.

The CPU 141 returns the iris mechanism 122 from the narrowing-down state to the open state via the iris drive circuit 135 (step S11). The CPU 141 returns the movable mirror 124 onto the photographing optical path, which is the first position, via the mirror driving circuit 136 (step S12, mirror down).

The CPU 141 determines whether the second release switch is turned off or not (step S13). If the second switch is not turned off, the CPU 141 returns to the processing at step S1 and repeats the processing from step S1 to step S12 until the second release switch is turned off. That is, if the second switch is not turned off at that moment, the continuous photographing continues. Then, the digital object images captured immediately before are displayed sequentially like a moving image on the finder device 130.

On the other hand, if the second release switch is turned off at step S13, it is determined that the camera operator is about to end the continuous photographing. In such a case, the CPU 141 instructs the signal processing circuit 145 to store the continuously photographed images that are temporarily stored in the SDRAM 148 into a predetermined storing region of the flash memory 150 (step S14). Then, the CPU 141 returns to the main routine.

Figure 10:
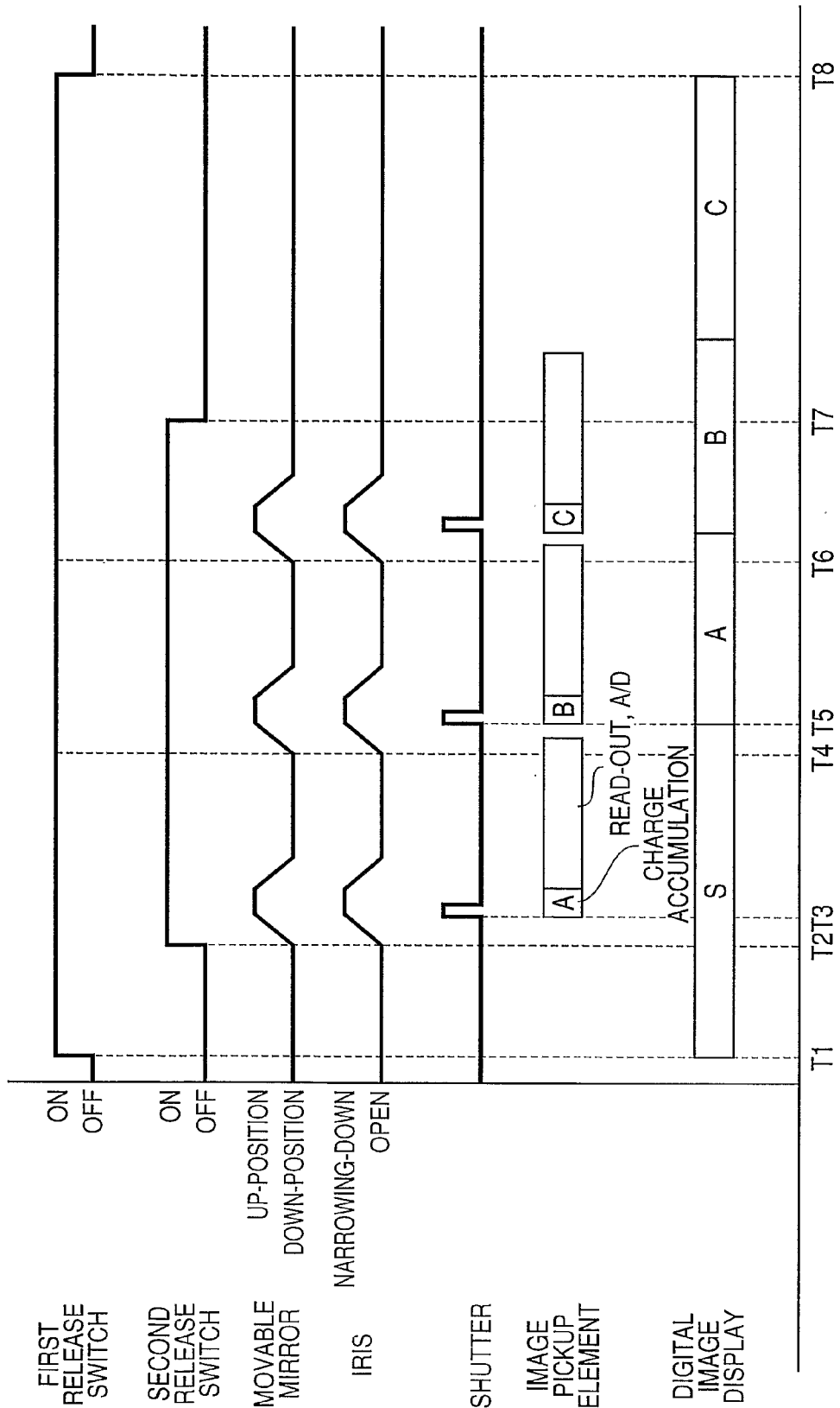
FIG. 10 is a timing chart illustrating a camera operation based on an operational sequence of the CPU 141.

FIG. 10 is a timing chart illustrating a camera operation based on an operational sequence of the CPU 141. The figure shows the case where half depression is performed on the release button, and then three frames are photographed by full depression of the release button, followed by half depression on the release button continued for a while.

When the first release switch is switched from off to on at the time T1 first, photometry and the exposure amount calculation are immediately performed. Then, the image captured at the time before is displayed on the second display region 190d of the finder device 130.

When the second release switch is switched from off to on at the time T2, the movable mirror 124 moves to the up position, while the iris of the photographing lens 120 is narrowed.

At the time T3, charge accumulation of the image pickup element 127 for an image A starts, while the shutter 126 is opened or closed. When the shutter 126 is closed, the charge accumulation of the image pickup element 127 stops and reading-out and A/D conversion on image signals of the image A start. Opening of the iris 122 and moving of the movable mirror 124 to the down position are also performed.

When reading-out and the A/D conversion of the image signal of the image A end, the digital image signals are temporarily stored in the continuous photographing data accumulation region of the SDRAM 148. The image data is converted into composite signals. When the composite signals are supplied to the liquid crystal display device 108, the captured image A is displayed on the LCD 108a so that an operator can visually check the image on the second display region 190d in the finder device 130. Until an instruction to update the digital image display is issued to the image A, an image S keeps to be displayed on the second display region 190d of the finder device 130 from the time T1.

If full depression of the release button still continues and the second release switch stays turned on also at the time T4, the movable mirror 124 moves to the up position again and the iris 122 of the photographing lens 120 is narrowed down.

At the time T5, the charge accumulation of the image pickup element 127 for capturing an image B starts, while the shutter 126 is opened or closed. When the shutter 126 is closed, the charge accumulation of the image pickup element 127 stops and reading-out and A/D conversion on the image signals of the image B start. Opening of the iris 122 and moving of the movable mirror 124 to the down position are also performed.

When reading-out and A/D conversion of the image signals of the image B end, the digital image signals are temporarily stored in the continuous photographing data storage region of the SDRAM 148 in order. The image data is converted into composite signals. When the composite signals are supplied to the liquid crystal display device 108, the captured image B is displayed on the LCD 108a so that an operator can visually check the image on the second display region 190d in the finder device 130. Until an instruction to update the digital image display is issued to the image B, the image A keeps to be displayed on the second display region 190d of the finder device 130.

If full depression of the release button still continues and the second release switch stays turned on also at the time T6, operations at the times T4 and T5 are repeated and the capturing operation of the image C is performed. Until an instruction to update the digital image display is issued to the image C, the image B keeps to be displayed on the second display region 190d of the finder device 130.

If full depression of the release button ends and the second release switch is turned off at the time T7, the continuous photographing ends. Reading-out and A/D conversion on the image C are performed, however, and the display updating operation to the image C continues.

If full depression of the release button ends and the first release switch is turned off at the time T8, displaying of the digital image in the second display region 190d of the finder device 130 stops.

In the abovementioned operational sequence, reading-out and A/D conversion of the image signal, storing of an image data to a memory (SDRAM 148), releasing of the iris 122, and returning of the movable mirror 124 to the first position (down position) are a preparation operation of capturing the next frame. In synch with the preparation operation of capturing the next frame, the digital image displayed on the second display region 190d is updated.

As mentioned above, according to the camera of the first embodiment, a user can check a state of the captured image, a setting state of a camera and image capturing auxiliary information with the digital image, while observation of the optical image of the object is kept possible without requiring the user to take the user's eyes from the finder. Therefore, a new camera, which does not miss a shutter chance, can be realized. More specifically, with the digital image shown with an optical image in the finder, capturing of foreign matters on the optical low-path filter or a change in the composition caused by operation of the image pickup element vibrationproof mechanism 171 can be recognized. Information including the white balance, the shaking of the image and the focus is also recognized. Accordingly, any failure in photographing can be prevented. As an optical image is shown there so that a user needs not to take the user's eyes from the finder when he or she checks the state of the photographed image, a shutter chance cannot be missed. As the optical image and the digital image are not superimposed, both images can be visually recognized. As the digital image is displayed in synch with the preparation operation of capturing the next frame, the abovementioned checking can be performed immediately after photographing.

Second Embodiment

Figure 11:
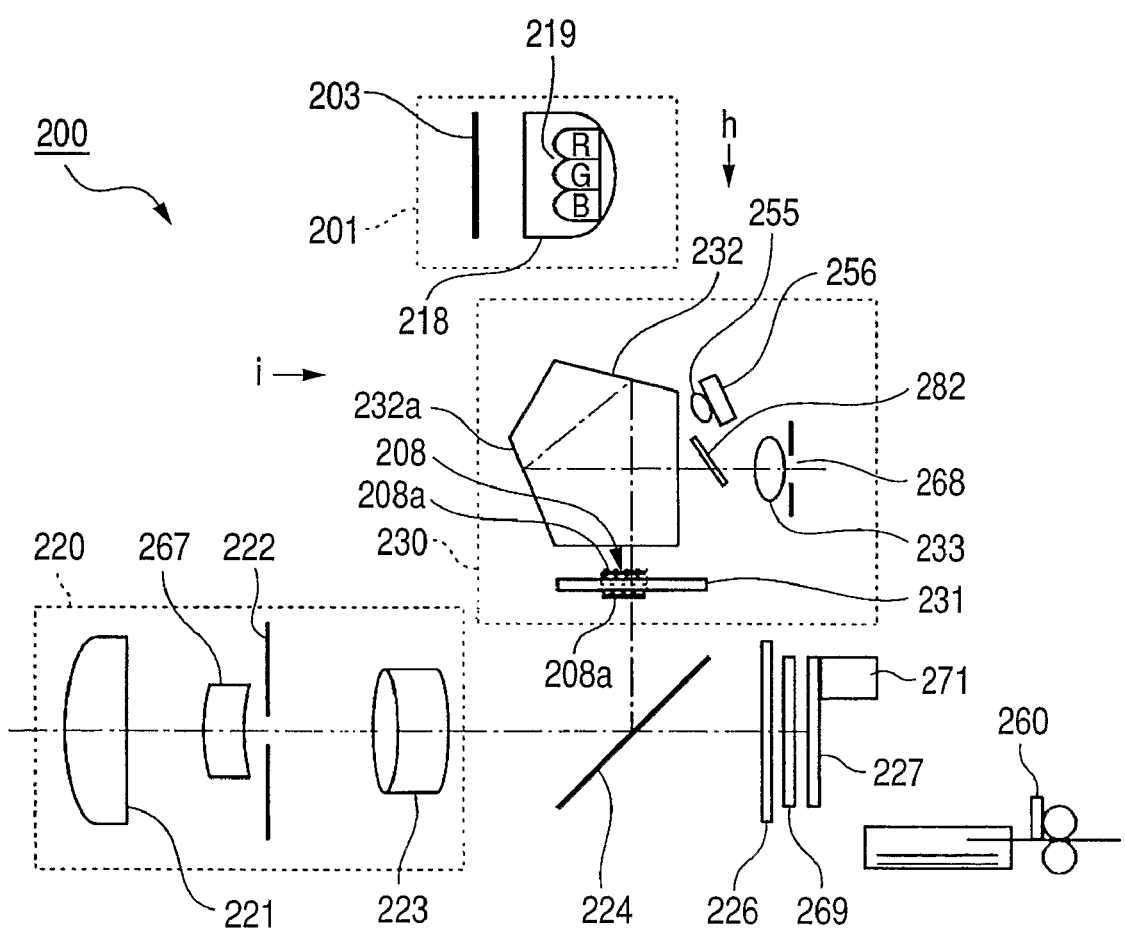
FIG. 11 is a diagram illustrating a partial configuration of the digital single lens reflex camera according to the second embodiment.

FIG. 11 is a diagram showing a partial configuration of the digital single lens reflex camera according to the second embodiment. The second embodiment has a different configuration from that of the first embodiment in that it uses a fixed pellicle mirror for dividing an optical path to the finder device, thus, it need no mirror driving circuit. It also differs in that it focuses with a hilltop climbing AF with an output from the image pickup element and has no AF sensor driving circuit. Yet it also differs in that it is adapted to be able to capture not only a still image but also a moving image by continuously driving the image pickup element.

A digital single lens reflex camera 200 includes a lighting unit 201, a photographing lens 220, a fixed pellicle mirror 224, a shutter 226, an image pickup element 227 with a rectangular image capture section with an aspect ratio 3:2, a finder device 230 and a built-in printer 260. The components included in the configuration of the digital single lens reflex camera of the second embodiment which are not shown in the figures are the same as those included in the configuration of that of the first embodiment and denoted by the same reference numerals.

The photographing lens 220 is formed by a plurality of groups of lenses 221, 267, 223 with an iris mechanism (simply referred to as an iris) 222 being provided between the groups of lenses. Behind the plurality of groups of lenses 221, 267, 223, the fixed pellicle mirror 224 is provided for dividing an incident visible light (incident light) into a transmitted light and a reflected light by the proportion of about 1:1. On the reflection optical path of the fixed pellicle mirror 224, a finder optical system including a focusing screen 231, a penta prism 232, and an eyepiece lens 233 is provided. The finder device 230 includes a liquid crystal display device 208, a photometry lens 255 and a photometry sensor 256 in addition to the finder optical system.

The object light transmitted through the groups of lenses 221, 267, 223 of the photographing lens 220 is reflected on the fixed pellicle mirror 224 and formed on the focusing screen 231. An observer visually recognizes the optical image (object image) formed on the focusing screen 231 through an eyepiece window 268 via the penta prism 232 and the eyepiece lens 233. An advantage in observing the optical image is that no temporal delay occurs.

The photometry sensor 256 is sensor for performing photometry for brightness of an object image on the focusing screen 231 via the photometry lens 255. The photometry sensor 256 is provided with the photometry lens 255 at the position on a photometry axis that is decentered from an observing optical axis of the eyepiece lens 233 in the finder device 230. The photometry sensor 256 is formed by a photodiode having a light receiving surface that is divided into a plurality of parts and obtains object luminance information (a BV value) for performing exposure control by using the luminance signals individually output from the photodiode.

Behind the fixed pellicle mirror 224, an image pickup element 227 such as a shutter 226, a dust removing mechanism driving circuit 269, and CCD or CMOS imager is provided.

The shutter 226 is opened in response to half depression operation of the release button and guides an object image to the light receiving surface of the image pickup element 227. When the object image is guided onto the light receiving surface of the image pickup element 227, the groups of lenses 221, 267, 223 of the photographing lens 220 are driven with the output for the image pickup element 227, and focusing against the object is performed. The dust removing mechanism 269 and the image pickup element vibrationproof mechanism 271 have the same functions as those of the dust removing mechanism 169 and the image pickup element vibrationproof mechanism 171 in the first embodiment.

Figure 12:
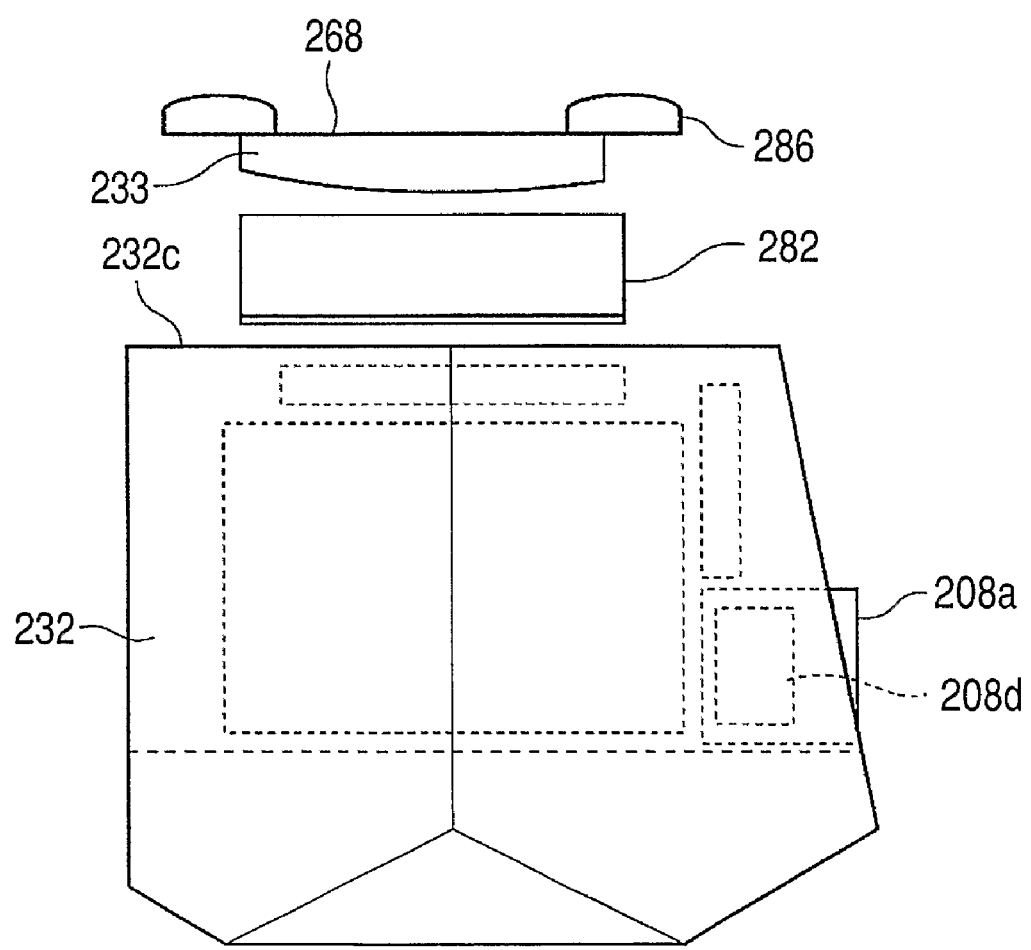
FIG. 12 is a plane diagram illustrating a configuration of a main part of the finder device 230 viewed in the direction of the arrow h in FIG. 11.
Figure 13:
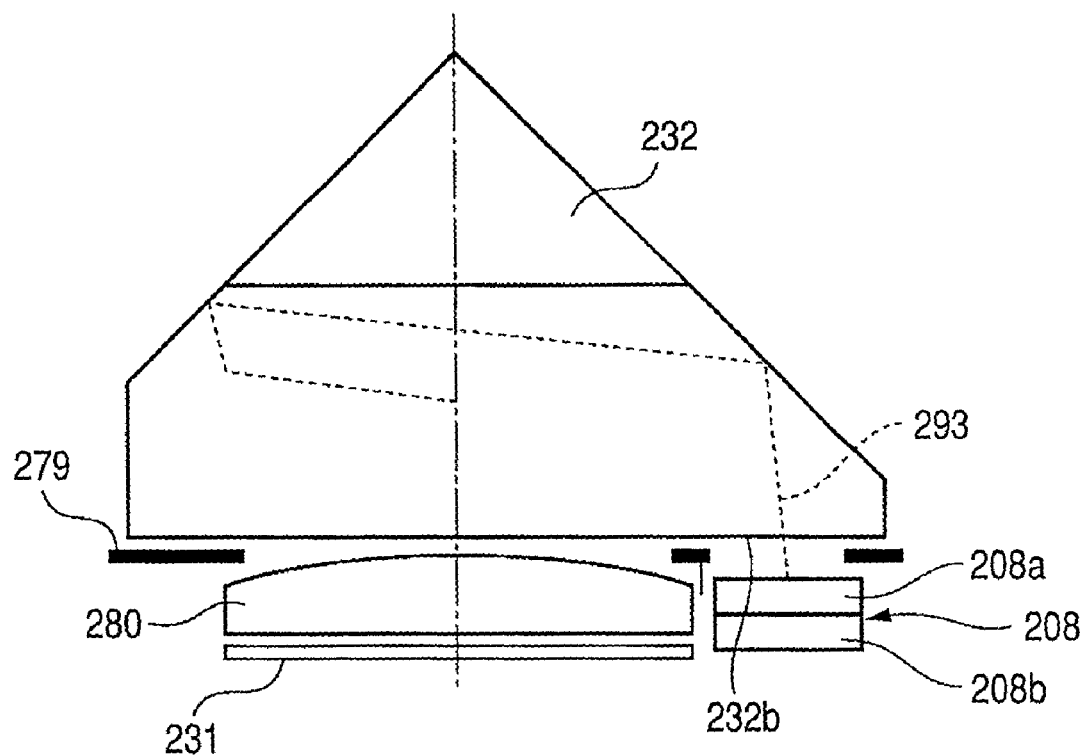
FIG. 13 is a side view illustrating a configuration of the main part of the finder device 230 viewed in the direction of the arrow i in FIG. 11.

FIG. 12 is a plane diagram showing a configuration of a main part of the finder device 230 viewed in the direction of the arrow h in FIG. 11. FIG. 13 is a side view illustrating a configuration of the main part of the finder device 230 viewed in the direction of the arrow i in FIG. 11.

On the optical path that is reflected and branched at the fixed pellicle mirror 224, a focusing screen 231, a condenser lens 280 and a penta prism 232 are provided. The object light formed on the focusing screen 231 by the groups of lenses 221, 267, 223 of the photographing lens 220 transmits through the condenser lens 280 and the penta prism 232 and ejected from the surface 232c toward the eyepiece window 268 surrounded by an eyecup 286. Here, the object light transmits through a dichroic mirror 282 and reaches the eyes of the observer who is looking into the eyepiece window 168 protected by an eyecup 286 through the eyepiece lens 233 and refocused on the observer's retina.

The dichroic mirror 282 reflects the light emitted from an organic EL display element (not shown) toward the eyepiece window 268. A field of view mask 279 has a rectangular aperture indicating a range of an object image to be captured by the image pickup element 227. A finder observer can watch distance measurement position information indicated by the organic EL display element superimposed on the object image in the field of view mask 279.

The liquid crystal display device 208 includes a LCD 208a and a backlight 208b. The LCD 208a has a color display device (LCD display region) with an aspect ratio of 16:9 to be provided for the digital image display in the field of view of the finder.

The light 293 emitted from the LCD display region 208d is incident into the penta prism 232 from the surface 232b of the penta prism 232 and ejected from the surface 232c of the penta prism 232. An optical path length from the eyepiece lens 233 to the LCD display region 208d is near to an optical path length from the eyepiece lens 233 to the focusing screen 231 and the diopter of the LCD display region 208d and the diopter of the focusing screen 231 actually match.

Figure 14:
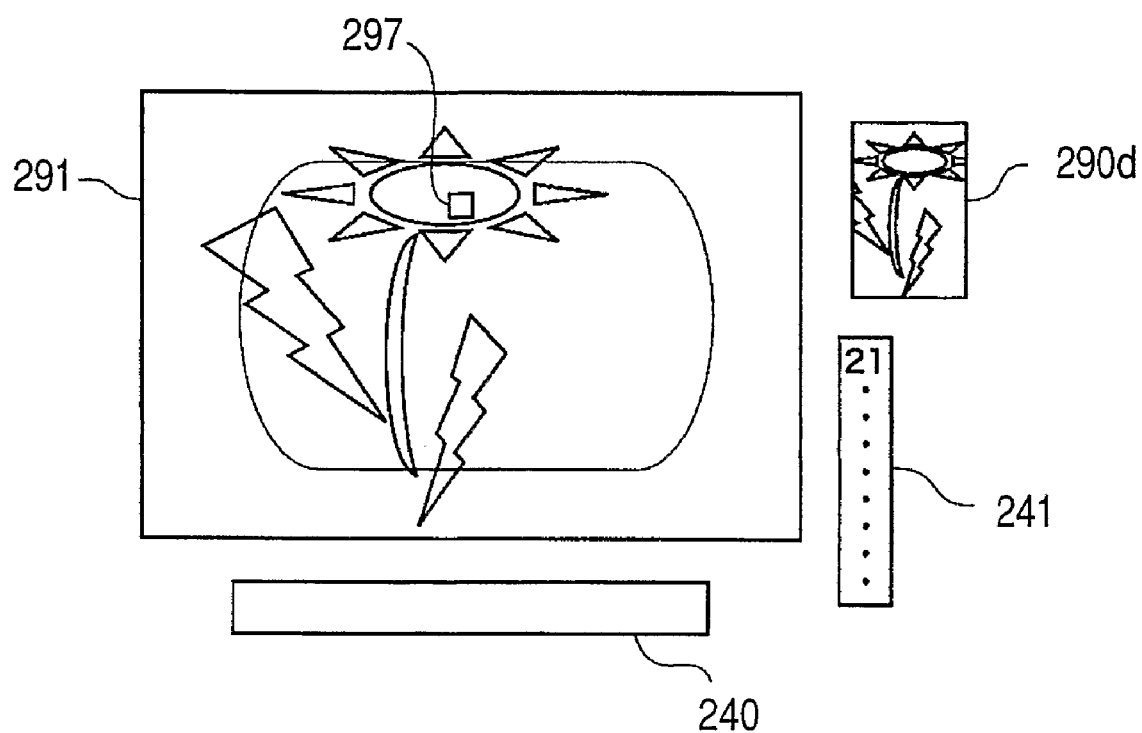
FIG. 14 is a diagram illustrating a display in the field of view of the finder.

FIG. 14 is a diagram showing a display in the field of view of the finder. The display in the field of view of the finder includes a first display region 291, a second display region 290d, a third display region 240, a fourth display region 241 and a distance measurement position information 297 that can be observed through the eyepiece window 268. The first display region 291 shows an optical image of an object, which is a subject, defined by an aperture of the field of view mask 279. The second display region 290d is on the right side of the first display region 291 and displays information by an image based on the LCD display region 208d of the LCD 208a. The third display region 240 is below the first display region 291 and displays information with a character string or an icon. The fourth display region 241 is on the right side of the first display region 291 and displays information with a character string or an icon. The distance measurement position information 297 is inside the first display region 291, being indicated by the organic EL display element.

The display luminance of each of the second display region 290d, the third display region 240, the fourth display region 241 and the distance measurement position information 297 is controlled to be a value appropriate for visual recognition based on an output from the photometry device including the photometry sensor 256 and the photometry lens 255.

The digital image displayed on the second display region 290d in a vertically rectangular shape is a real time captured image (EVF (electric view finer) image) pixels of which are thinned out up to a frame rate of about 60 frames per second as one of information display. On the second display region 290d, a partial image near the distance measurement position information 297 is displayed. With the EVF image, capturing of foreign matters adherent on the optical low-path filter, a change in the composition caused by operation of the image pickup element vibrationproof mechanism 271, a white balance and a focus of the image can be recognized. A crop function for cutting a captured area from the entire screen of the image pickup element 227 may be mounted so that the EVF image may be the cut out image.

Figure 15:
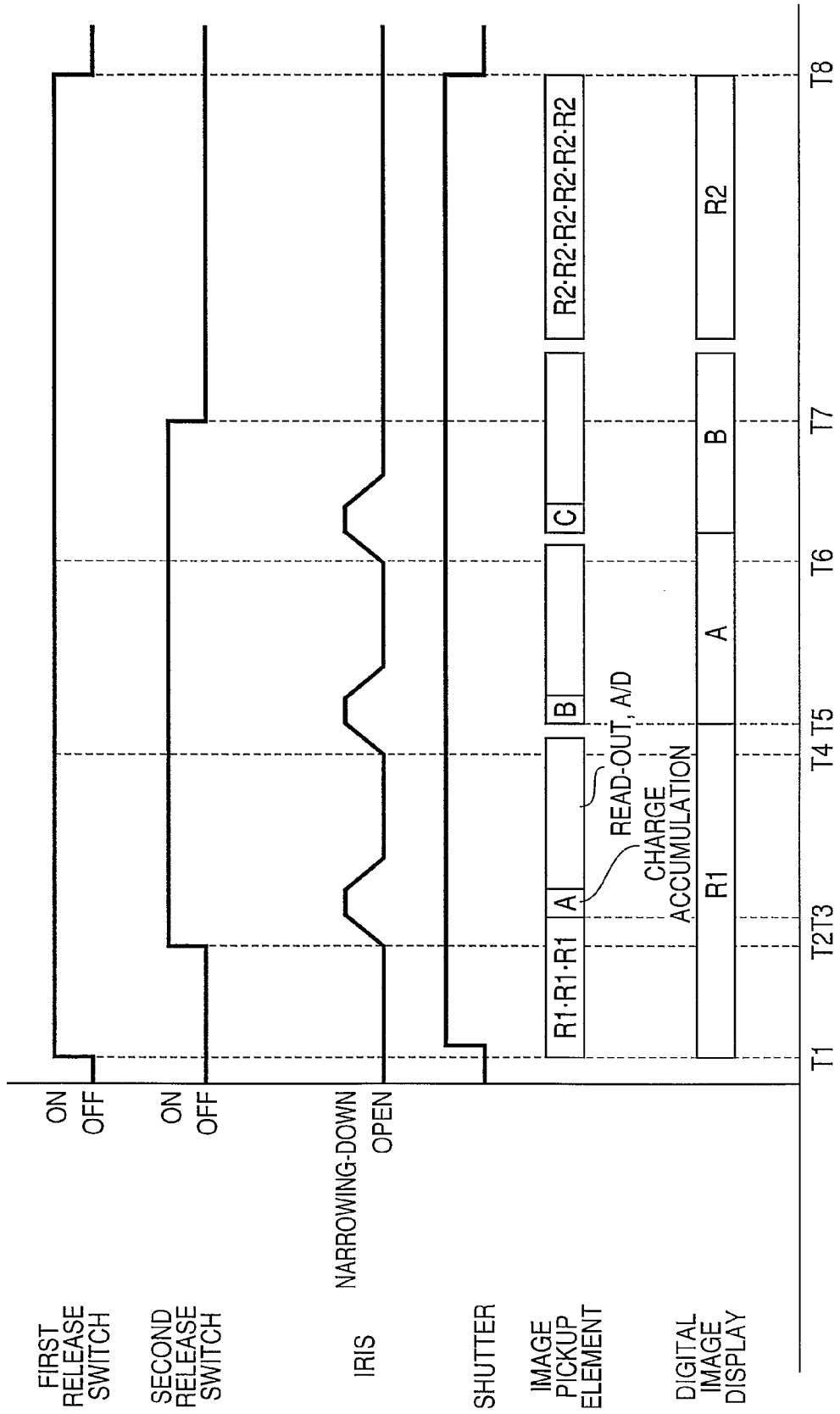
FIG. 15 is a timing chart illustrating a camera operation based on an operational sequence of the CPU 141.

FIG. 15 is a timing chart showing a camera operation based on an operational sequence of the CPU 141. The figure shows the case where after half depression performance is performed on the release button, full depression on the release button causes three frames to be captured, and then half depression on the release button is kept for a while.

When the first release switch is switched from off to on at the time T1 first, photometry and the exposure amount calculation is immediately performed. Then, the shutter 226 is opened and a real time image R1 is captured by the image pickup element 227 at the frame rate of about 60 frames per second and the image is displayed on the second display region 290d of the finder device 230.

When the second release switch is switched from off to on at the time T2, the iris 222 of the photographing lens 220 is narrowed.

At the time T3, charge accumulation of the image pickup element 227 for an image A starts. After predetermined seconds passed, the charge accumulation of the image pickup element 227 stops and reading-out and A/D conversion on image signals of the image A are performed, while the iris 222 is released. When reading-out and A/D conversion on the image signals of the image A end, the digital image signals are temporally stored in the continuous photographing data accumulation region of the SDRAM 148 in order. The digital image signals (image data) are converted into the composite signals.

As the composite signals are supplied to the liquid crystal display device 208, the captured digital image A is displayed on the LCD 208a so that it can be visually recognized on the second display region 290d in the finder device 230. Until an instruction to update the digital image display is issued to the image A, an image R1 keeps to be displayed on the second display region 290d of the finder device 230 from the time T1.

As full depression of the release button continues and the second release switch still stays turned on at the time T4, the iris 222 of the photographing lens 220 is narrowed again.

At the time T5, the charge accumulation of the image pickup element 227 for an image B starts, and when predetermined seconds passed, the charge accumulation of the image pickup element 227 stops and reading-out and A/D conversion on the image signals of the image B are performed, while iris 222 is released.

When reading-out and A/D conversion of the image signals of the image B end, the digital image signals are temporally stored in the continuous photographing data storage region of the SDRAM 248 in order. The digital image signal (image data) is converted into composite signals.

As the composite signals are supplied to the liquid crystal display device 208, the captured digital image B is displayed on the LCD 208a so that it can be visually recognized on the second display region 290d in the finder device 230. Until an instruction to update the digital image display is issued to the image B, an image A keeps to be displayed on the second display region 290d of the finder device 230.

As full depression of the release button continues and the second release switch still stays turned on at the time T6, operations after the time T4 are repeated and the capturing operation of the image C is performed.

As full depression of the release button ends and the second release switch is turned off at the time T7, the continuous photographing ends. Reading-out and A/D conversion on the image C are continued to be performed, however. Then, a real time image R2 is captured by the image pickup element 227 at a frame rate of about 60 frames per second again and the image is displayed on the second display region 290d in the finder device 230.

As half depression of the release button ends and the first release switch is turned off at the time T8, displaying of the digital image in the second display region 290d in the finder device 130 stops and the shutter 226 is closed.

In the abovementioned operational sequence, reading-out and A/D conversion of the image signal, storing of image data into a memory and releasing of the iris 222 are a preparation operation for capturing the next frame.

According to the second embodiment as such, with the EVF image in the second display region, capturing of foreign matters adherent on the optical low-path filter, a change in the composition caused by operation of the image pickup element vibrationproof mechanism, a white balance and a focus of the image can be recognized. Therefore, a failure in capturing an image can be prevented. As a user needs not to take the user's eyes from the finder, the user keeps watching the optical image so that he or she does not miss a shutter chance by checking a state of the digital image. As the optical image and the digital image are not superimposed, both of the images can be visually recognized. As the digital image is displayed in synch with the preparation operation of capturing the next frame, the abovementioned checking can be performed immediately after photographing.

Third Embodiment

Figure 16:
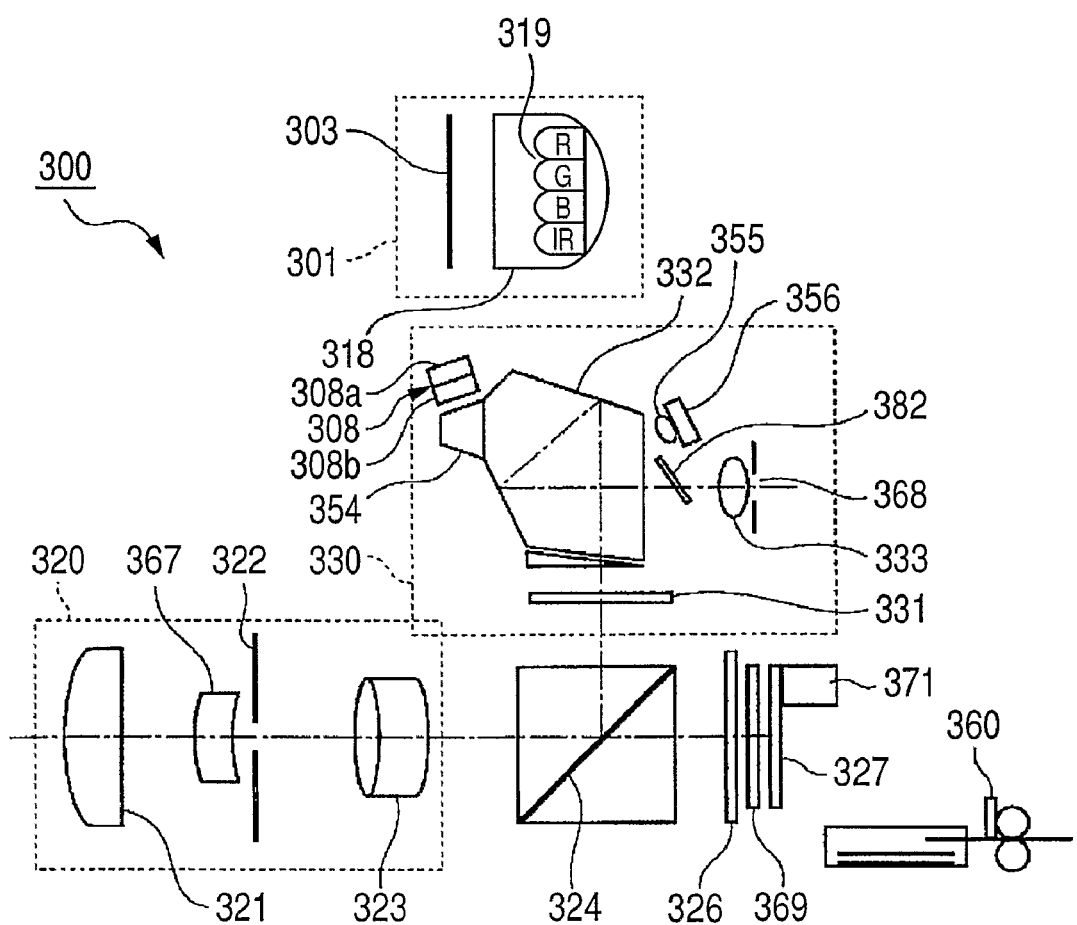
FIG. 16 is a diagram illustrating a partial configuration of the digital single lens reflex camera according to the third embodiment.

FIG. 16 is a diagram showing a partial configuration of the digital single lens reflex camera according to the third embodiment. The third embodiment has a different configuration from that of the second embodiment in that it uses a beam splitter in a prism form for dividing an optical path to the finder device and that it directs a visible light to the finder device and an infrared light to the image capture apparatus. It is the same as the second embodiment in that it needs no mirror driving circuit and that it focuses with a hill climbing AF with an output from the image pickup element and has no AF sensor driving circuit.

A digital single lens reflex camera 300 includes an infrared lighting unit 301, a photographing lens 320, a prism beam splitter 324, a shutter 326, an image pickup element 327 with a rectangular image capture section with an aspect ratio 3:2, a finder device 330 and a built-in printer 360. The infrared lighting unit 301 includes an emitting panel 303, a reflector 318 and a high luminance LED 119 for each color of RGB for a visual light and IR for an infrared light. The components not shown in the configuration of the digital single lens reflex camera of the third embodiment are the same as those in the first embodiment and denoted by the same reference numerals.

The photographing lens 320 is formed by a plurality of groups of lenses 321, 367, 323. An iris mechanism (simply referred to as an iris) 322 is provided between the groups of lenses.

Figure 17:
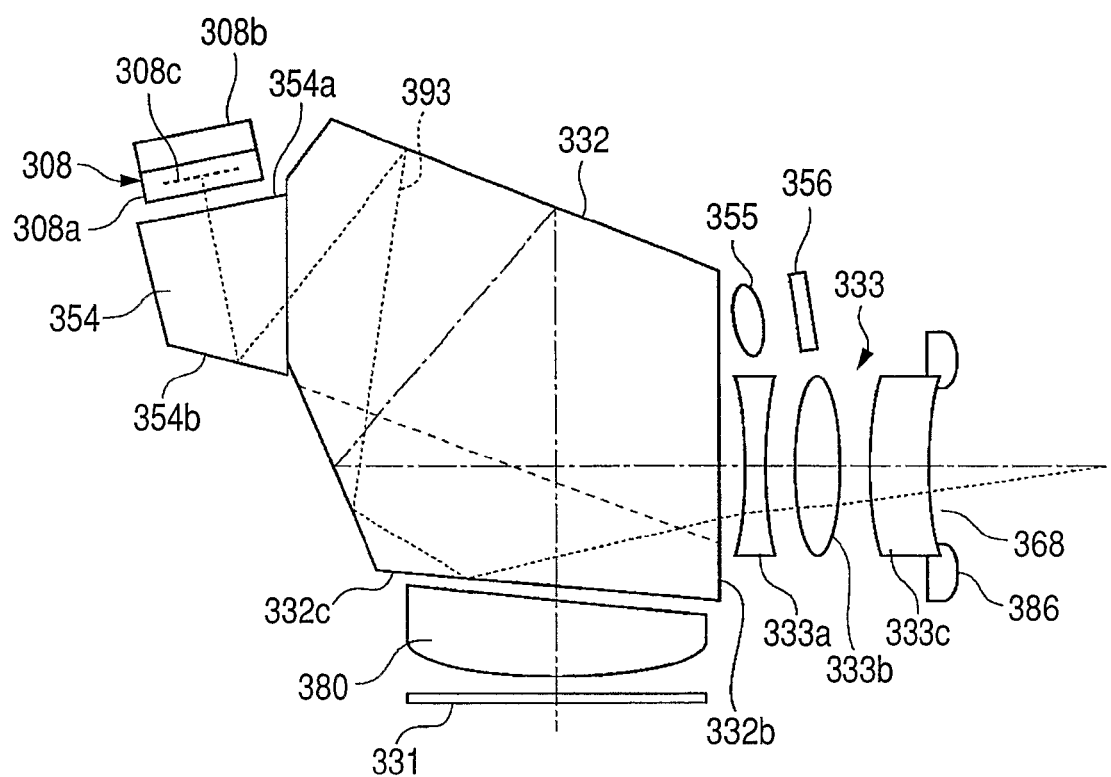
FIG. 17 is a cross-sectional diagram illustrating a configuration of a main part of the finder device 330.

Behind the plurality of groups of lenses 321, 367, 323, the prism beam splitter 324 is provided. The prism beam splitter 324 reflects a visual light included in an incident light and transmits the infrared light included in the incident light. On the reflection optical path of the prism beam splitter 324, a finder optical system formed by a focusing screen 331, a penta prism 332 formed by an optical glass and an eyepiece lens 333 is provided. The finder device 330 includes a liquid crystal display device 308, a photometry lens 355 and a photometry sensor 356 in addition to the finder optical system. FIG. 17 is a cross-sectional diagram showing a configuration of a main part of the finder device 330.

An object light transmitted through the groups of lenses 321, 367, 323 in the photographing lens 320 is reflected on the prism beam splitter 324 and forms an image on the focusing screen 331. An observer recognizes an optical object image formed on the focusing screen 331 through an eyepiece window 368 via the penta prism 332 and the eyepiece lens 333 formed by lenses 333a, 333b, 333c. An advantage of observing the optical image is that no temporal delay substantially occurs and that the color of the object as it is seen by the visible light can be observed.

The photometry sensor 356 is a sensor for measuring emission strength of the object image on the focusing screen 331 via the photometry lens 355 and it outputs for a visible light. The photometry sensor 356 is in the finder device 330 provided at the position on a photometry axis that is decentered from an observing optical axis of the eyepiece lens 333 with the photometry lens 355. The photometry sensor 356 is formed by a photodiode having a light receiving surface that is divided into a plurality of parts and obtains physical luminance information for controlling infrared exposure on the luminance outputs that are individually output from the photodiode.

Behind the prism beam splitter 324, a shutter 326, a dust removing mechanism driving circuit 369, and image pickup elements 327 such as a CCD or a CMOS imager are provided. The shutter 326 opens in response to half depression of the release button for directing the object image to the light receiving surface of the image pickup element 327. When the object image is guided onto the photoreceptor of the image pickup element 327, the groups of lenses 320, 367, 323 of the photographing lens 320 are driven with the output and focusing against the object is performed. The dust removing mechanism 369 and the image pickup element vibrationproof mechanism 371 have the same functions as those of the dust removing mechanism 169 and the image pickup element vibrationproof mechanism 171 in the first embodiment.

On the optical path that is reflected and branched at the prism beam splitter 324, a focusing screen 331, a condenser lens 380 in which a prism and a convex lens are integrated together and a penta prism 332 are provided.

An object light that is formed on the focusing screen 331 by the groups of lenses 321, 367, 323 in the photographing lens 320 is transmitted through the condenser lens 380 and the penta prism 332 and emitted from the surface 332b towards the eyepiece window 368 surrounded by an eyecup 386. The object light travels through the eyepiece lens 333 and reaches the eyes of an observer who is looking into the eyepiece window 168 as it is protected by the eyecup 386 and refocused on the observer's retinas.

The bottom surface 332c of the penta prism 332 is an inclined plane to match the prism shape of the condenser lens 380 so that an optical axis from the condenser lens 380 to the penta prism 332 does not tilt.

Figure 18:
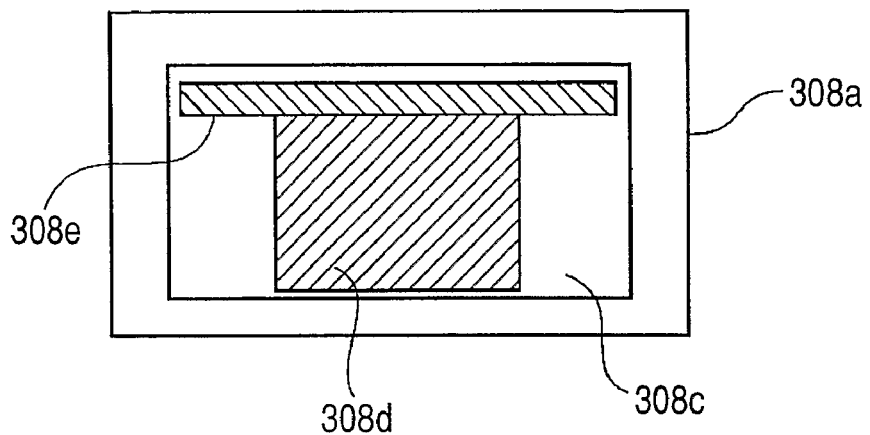

The liquid crystal display device 308 is formed by an LCD 308a and a backlight 308b. FIG. 18 is a diagram showing a display screen of the LCD 308a. The LCD 308a has a color display section 308c with an aspect ratio of 16:9, and provides the LCD display region 308d in the display section 308c for the digital image display in the field of view of the finder and the LCD display region 308e for information display with a character string or an icon.

The light 393 emitted form the LCD display regions 308d, 308e in the LCD 308a is incident from the surface 354a of the prism 354 fixed to the penta prism 332, reflected on the surface 354b, on which aluminum is evaporated, and incident into the penta prism 332. The light 393 is reflected twice inside the penta prism 332, and then fully reflected on the tilted surface 332c and emitted from the surface 332b.

Here, an optical path length from the eyepiece lens 333 to the LCD display region 308d and an optical path length from the eyepiece lens 333 to the focusing screen 331 are almost the same. The diopter of the LCD display region 308d and the diopter of the focusing screen 331 are substantially the same.

Figure 19:
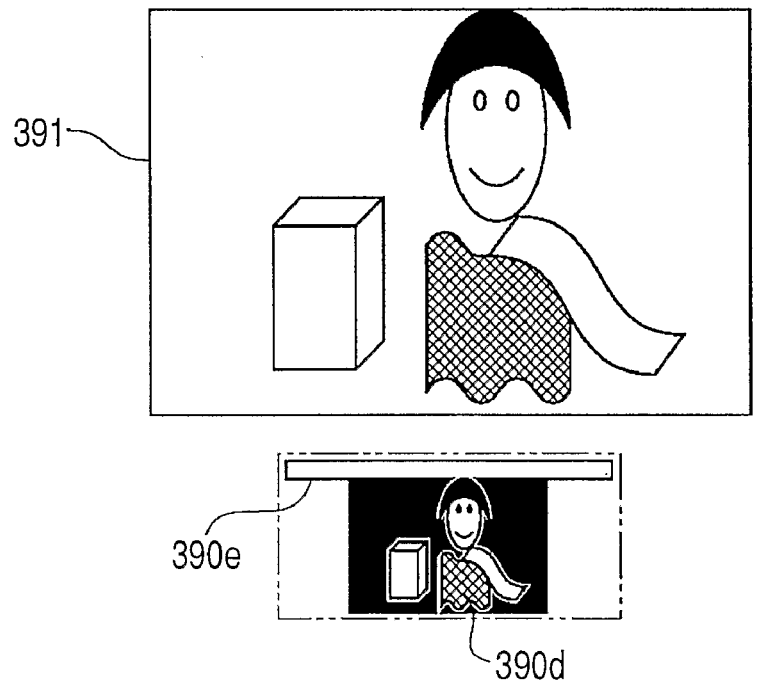
FIG. 19 is a diagram illustrating a display in the field of view of the finder.

FIG. 19 is a diagram showing a display in the field of view of the finder. The display in the field of view of the finder includes a first display region 391, a second display region 390d and a third display region 390e. The first display region 391 indicates an optical image of an object, which is a subject defined by an aperture of the field of view mask. The second display region 390d is below the first display region 391 and displays information based on the LCD display region 308d of the LCD 308a. The third display region 390e is below the first display region 391 and displays information with a character string or an icon based on the LCD display region 308e of the LCD 308a. Here, the display luminance of each of the second display region 390d and the third display region 390e is controlled to be a value appropriate for visual recognition based on a visual light output from the photometry device including the photometry sensor 356 and the photometry lens 355.

The digital image displayed on the second display region 390d in a horizontally rectangular shape is a real time captured image (EVF image) pixels of which are thinned out up to a frame rate of about 60 frames per second as one of information display. With the digital image, checking of the captured object image by an infrared light, capturing of foreign matters adherent on the optical low-path filter, a change in the composition caused by operation of the image pickup element vibrationproof mechanism 371, a white balance and a focus of the image can be recognized.

Figure 20:
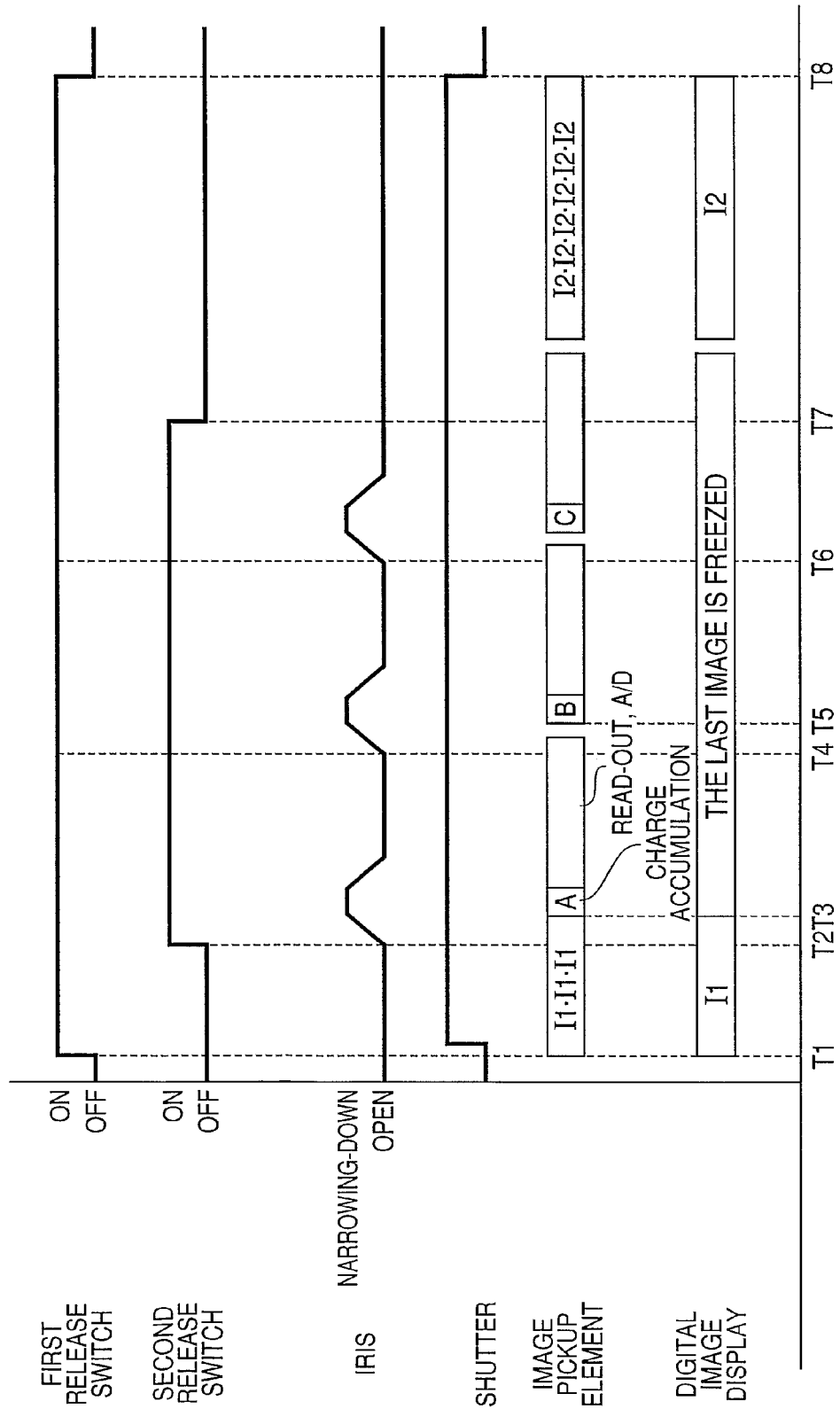
FIG. 20 is a timing chart illustrating a camera operation based on an operational sequence of the CPU 141.

FIG. 20 is a timing chart showing a camera operation based on an operational sequence of the CPU 141. The figure shows the case where half depression is performed on the release button, and then three frames are photographed by full depression of the release button, followed by half depression on the release button continued for a while.

When the first release switch is switched from off to on at the time T1 first, photometry and the exposure amount calculation are immediately performed. Then, the shutter 326 is released, and the real time image 11 is captured by the image pickup element 327 at a frame rate of about 60 frames per second and displayed on the second display region 390d of the finder device 330.

When the second release switch is switched from off to on at the time T2, the iris 322 of the photographing lens 320 is narrowed.

At the time T3, charge accumulation of the image pickup element 327 for an image A starts. After predetermined seconds passed, the charge accumulation of the image pickup element 327 stops and reading-out and A/D conversion on image signals of the image A are performed, while the iris 322 is released.

When reading-out and A/D conversion of the image signals of the image A end, the digital image signals are temporally stored in the continuous photographing data storage region of the SDRAM 148 in order. The digital image signal is displayed as it is frozen (freeze display) in the final frame of the real time image.

As full depression of the release button continues and the second release switch still stays turned on at the time T4, the iris 322 of the photographing lens 320 is narrowed again.

At the time T5, the charge accumulation of the image pickup element 327 for an image B starts, and when predetermined seconds passed, the charge accumulation of the image pickup element 327 stops and reading-out and A/D conversion on the image signals of the image B are performed, while iris 322 is released.

When reading-out and A/D conversion of the image signals of the image B end, the digital image signals are temporally stored in the continuous photographing data storage region of the SDRAM 148 in order. The digital image signal is displayed as it is frozen in the final frame of the real time image.

As full depression of the release button still continues and the second release switch stays turned on still at the time T6, operations after the time T4 are repeated and the capturing operation of the image C is performed.

As full depression of the release button ends and the second release switch is turned off at the time T7, the continuous photographing ends. Reading-out and A/D conversion on the image C are continued to be performed, however. Then, a real time image 12 is captured at a frame rate of about 60 frames per second again and the image is displayed on the second display region 390d in the finder device 330.

As half depression of the release button ends and the first release switch is turned off at the time T8, displaying of the digital image in the second display region 390d of the finder device 330 stops and the shutter 326 is closed.

In the abovementioned operational sequence, reading-out and A/D conversion of the image signal, storing of image data to a memory and releasing of the iris 322 are a preparation operation for capturing the next frame.

According to the infrared camera of the third embodiment, with the EVF image, the appearance of captured object image by an infrared light, capturing of foreign matters adherent on the optical low-path filter, a change in the composition caused by operation of the image pickup element vibrationproof mechanism, a white balance and a focus of the image can be recognized. Therefore, a failure in capturing an image can be prevented. As a user needs not to take the user's eyes from the finder, the user does not miss a shutter chance by checking a state of the EVF image. By using an optical image, an object can be captured with its natural color by a visible light. As the optical image and the digital image are not superimposed, both of the images can be visually recognized well.

Fourth Embodiment

The configuration of the camera of the fourth embodiment has the same configuration as that of the first embodiment, it will be omitted from the description. In the fourth embodiment, a case where map information is displayed an information display by the digital image is shown. The map information is displayed when the digital image converted from a corresponding optical image by the image pickup element 127 is not displayed on the LCD display region 108d of the LCD 108a.

Figure 21:
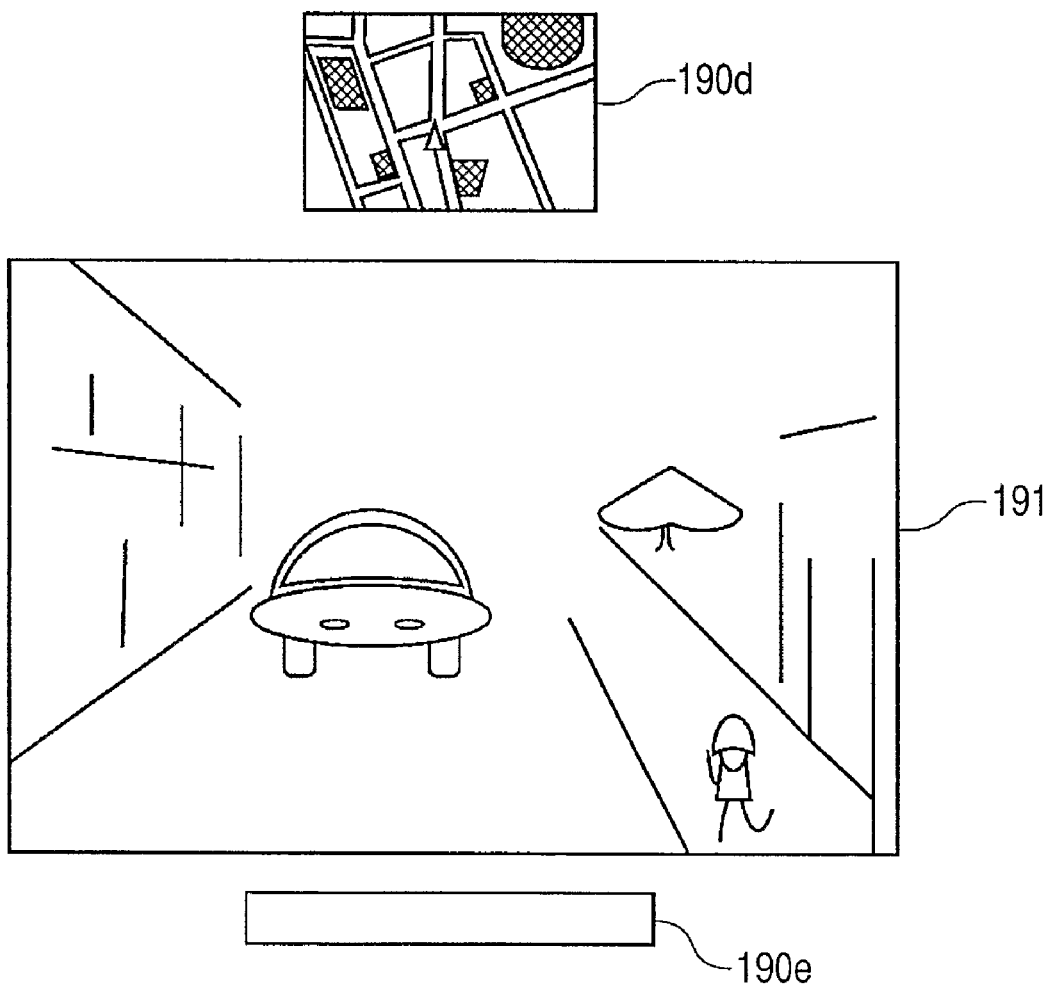
FIG. 21 is a diagram illustrating a display in the field of view of the finder in the fourth embodiment.

FIG. 21 is a diagram showing a display in the field of view of the finder in the fourth embodiment. The digital image displayed on the second display region 190d is map information including an image capture position as an information display. The optical image displayed on the first display region 191 is an object image of a subject captured by the photographing lens 120.

The map information is obtained based on a position coordinate of the camera obtained by a GPS circuit 162 by connecting to the Internet via a wireless LAN by the wireless communication circuit 163. The map information is a photograph of a ground captured from a satellite or a visual image of a digital map.

According to the digital image, the point and direction of the image capturing can be visually captured. As a user needs not to take the user's eyes from the finder, the user does not miss a shutter chance by checking image capturing auxiliary information such as a map. As the optical image and the digital image are not superimposed, both of the images can be visually recognized.

Figure 22:
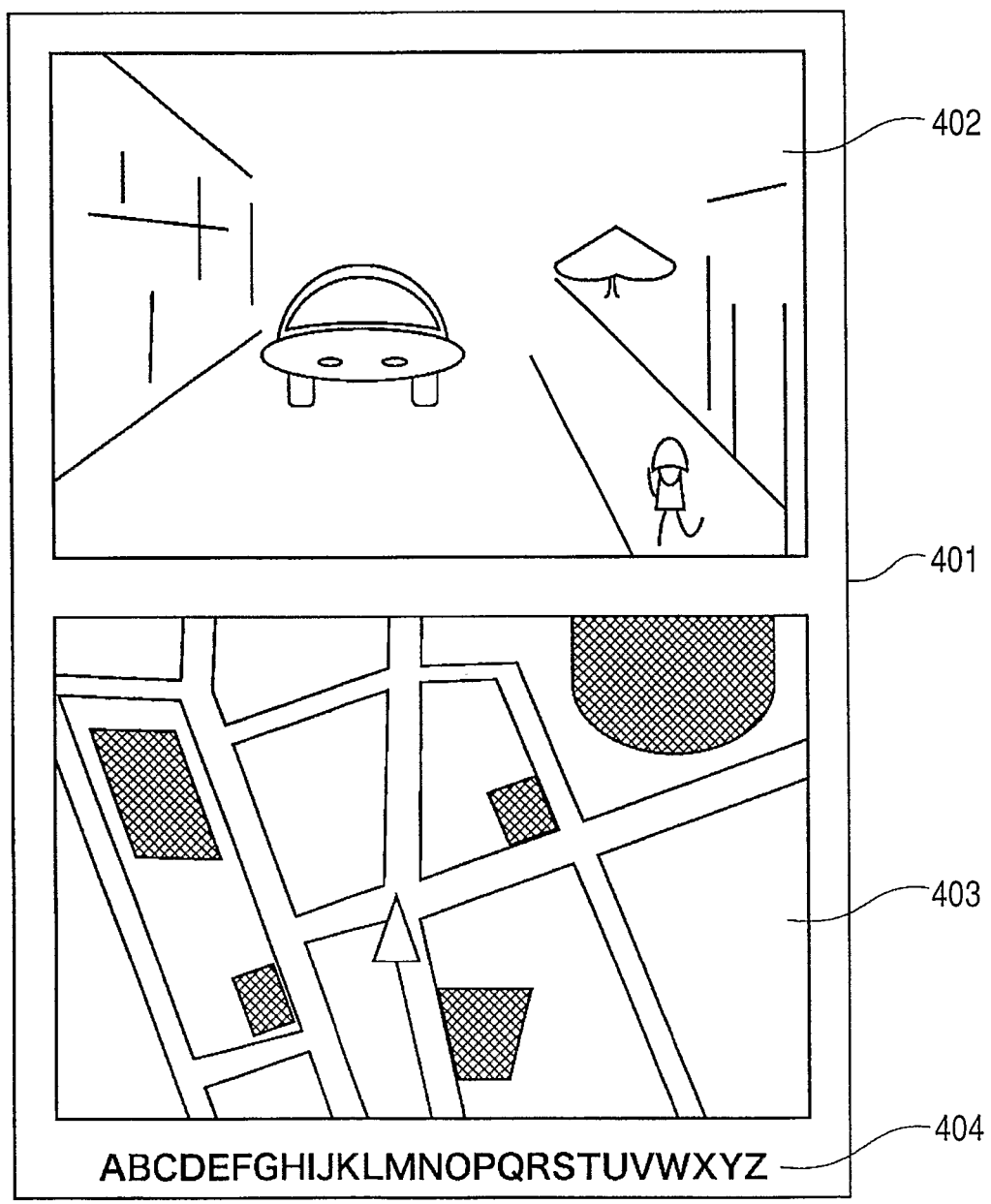
FIG. 22 is a diagram illustrating printed map information.

FIG. 22 is a diagram showing printed map information. The map information 403 can be printed on a single sheet of print paper 401 with the captured image 402 as the built-in printer 160 is controlled from the printer controlling circuit 161. In this manner, such a trouble that the position where the image was captured cannot be identified when a time passed after print can be prevented.

It is also possible that a character string input from the keyboard on the portable telephone is sent to the camera 50 according to the IrDA standard, for example, by using the infrared communication circuit 170 to be printed as the character string 404 with the image 402 or the map information 403.

As such, according to the camera of the fourth embodiment, when the map information is displayed as the digital image, a user can visually check the point and direction of image capturing, so that he or she cannot miss a shutter chance.

Fifth Embodiment

As the configuration of the camera in the fifth embodiment is the same as that of the first embodiment, it will be omitted from the description. In the fifth embodiment, the case where a still image that is captured by another camera is displayed as an information display by the digital image is shown. The still image that is captured by another camera is displayed when the digital image converted from a corresponding optical image by the image pickup element 127 is not displayed on the LCD display region 108d in the LCD 108a.

Figure 23:
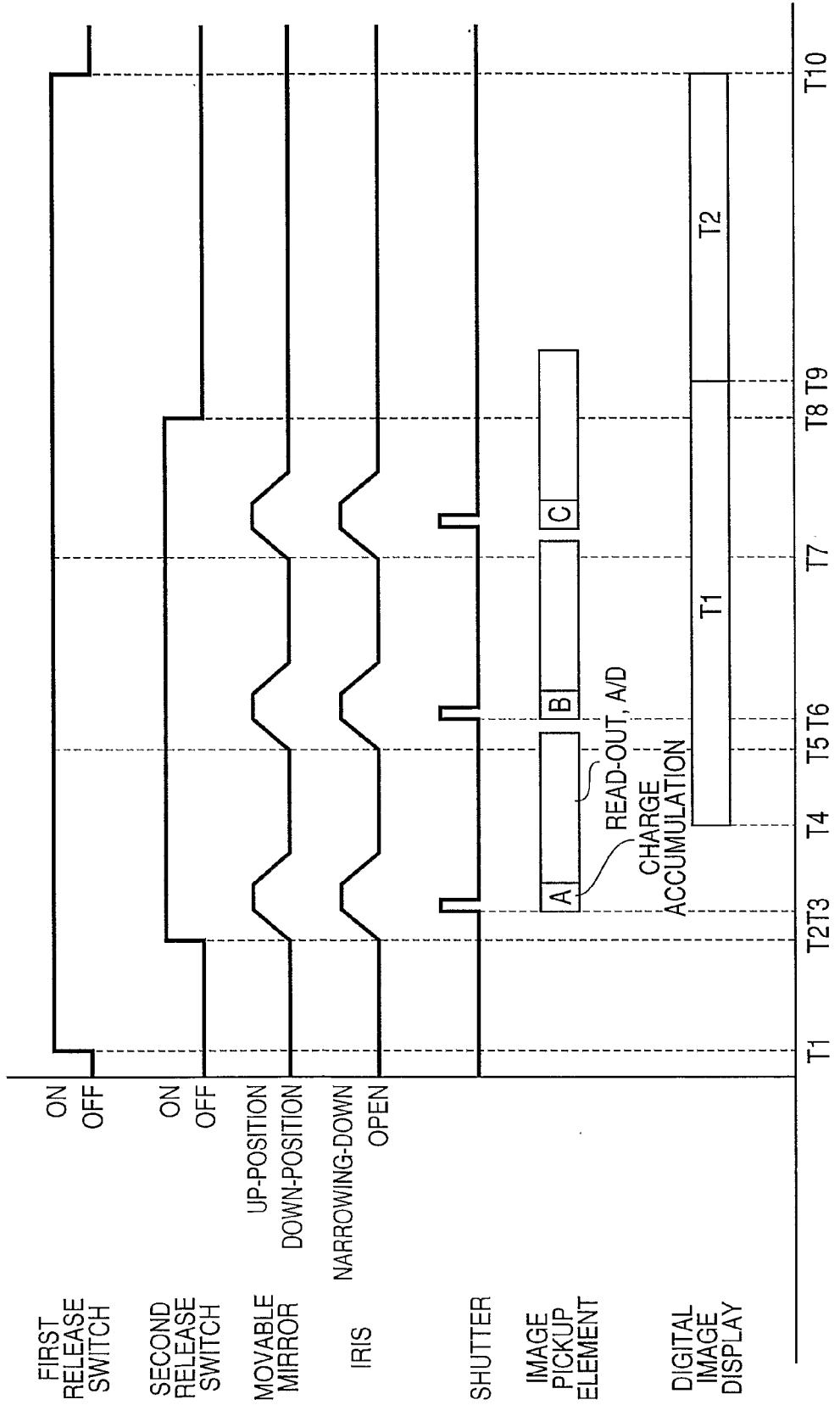
FIG. 23 is a timing chart illustrating a camera operation based on an operational sequence of the CPU 141 in the fifth embodiment.

FIG. 23 is a timing chart showing a camera operation based on an operational sequence of the CPU 141 in the fifth embodiment. Here, the case where half depression is performed on the release button, and then three frames are photographed by full depression of the release button, followed by half depression on the release button continued for a while is shown.

When the first release switch is switched from off to on at the time T1 first, photometry and the exposure amount calculation is immediately performed.

When the second release switch is switched from off to on at the time T2, the movable mirror 124 moves to the up position, while the iris 122 of the photographing lens 120 is narrowed.

At the time T3, charge accumulation of the image pickup element 127 for an image A starts, while the shutter 126 is opened or closed. When the shutter 126 is closed, the charge accumulation of the image pickup element 127 stops and reading-out and A/D conversion on image signals of the image A is performed. Releasing of the iris 122 and moving of the movable mirror 124 to the down position are also performed. When reading-out and the A/D conversion of the image signal of the image A end, the digital image signals are temporarily stored in the continuous photographing data accumulation region of the SDRAM 148 in order.

At the time T4, an interruption signal to inform that an image captured by another camera is sent from a server device, which is connected to the Internet through a wireless LAN via the wireless communication circuit 163 is issued. When the CPU 141 receives the interruption signal, it instructs the signal processing circuit 145 to perform conversion to convert the image data T1 into the composite signal. The signal processing circuit 145 converts the image data T1 into the composite signal, supplies the composite signal to the liquid crystal display device 108 and displays the received digital image T1 on the LCD 108a. In this manner, the digital image can be visually recognized in the second display region 109d in the finder device 130.

As the full depression of the release button is kept and the second release switch is still turned on at the time T5, the movable mirror 124 moves to the up position again, while the iris 122 of the photographing lens 120 is narrowed.

At the time T6, charge accumulation of the image pickup element 127 for the image B starts, while the shutter 126 is opened or closed. When the shutter 126 is closed, the charge accumulation of the image pickup element 127 stops and reading-out and A/D conversion of the image signal are performed. Releasing of the iris 122 and moving of the movable mirror 124 to the down position are also performed. When reading and the A/D conversion of the image signal of the image B end, the digital image signals are temporarily stored in the continuous photographing data accumulation region of the SDRAM 148 in order.

As the full depression of the release button is kept and the second release switch is still turned on at the time T7, operations after the time T5 are repeated and the image C is captured.

As full depression of the release button ends and the second release switch is turned off at the time T8, continuous photographing ends. Reading-out and A/D conversion of the image C are kept, however.

At the time T9, an interruption signal to inform that an image captured by another camera is sent from a server device, which is connected to the Internet through a wireless LAN via the wireless communication circuit 163 is issued. When the CPU 141 receives the interruption signal, it instructs the signal processing circuit 145 to perform conversion to convert the image data T2 into the composite signal. The signal processing circuit 145 converts the image data T2 into the composite signal, supplies the composite signal to the liquid crystal display device 108 and displays the received digital image T2 on the LCD 108a. In this manner, the digital image can be visually recognized in the second display region 109d of the finder device 130.

As half depression of the release button ends and the first release switch is turned off at the time T10, the digital image display on the second display region 190d in the finder device 130 stops.

As such, according to the camera of the fifth embodiment, a user can recognize an image captured by another camera so that the user can recognize what photographs are taken by another user in the press team in the newspaper company or the press agency. Therefore, members in the press team can more firmly cooperate with each other. As a user needs not to takes the user's eyes from the finder and keeps watching the optical image, the user does not miss a shutter chance by checking image capturing auxiliary information such as an image captured by another camera. As the optical image and the digital image are not superimposed, both of the images can be visually recognized.

Sixth Embodiment

As the configuration of the camera in the sixth embodiment is the same as that of the first embodiment, it will be omitted from the description. In the sixth embodiment, the case where a moving image that is captured by another camera, especially the case where a television camera for television broadcasting (an image for television broadcasting) is displayed as an information display by the digital image is shown. The image for television broadcasting is displayed when the digital image whose optical image is converted by the image pickup element 127 is not displayed on the LCD display region 108d of the LCD 108a.

Figure 24:
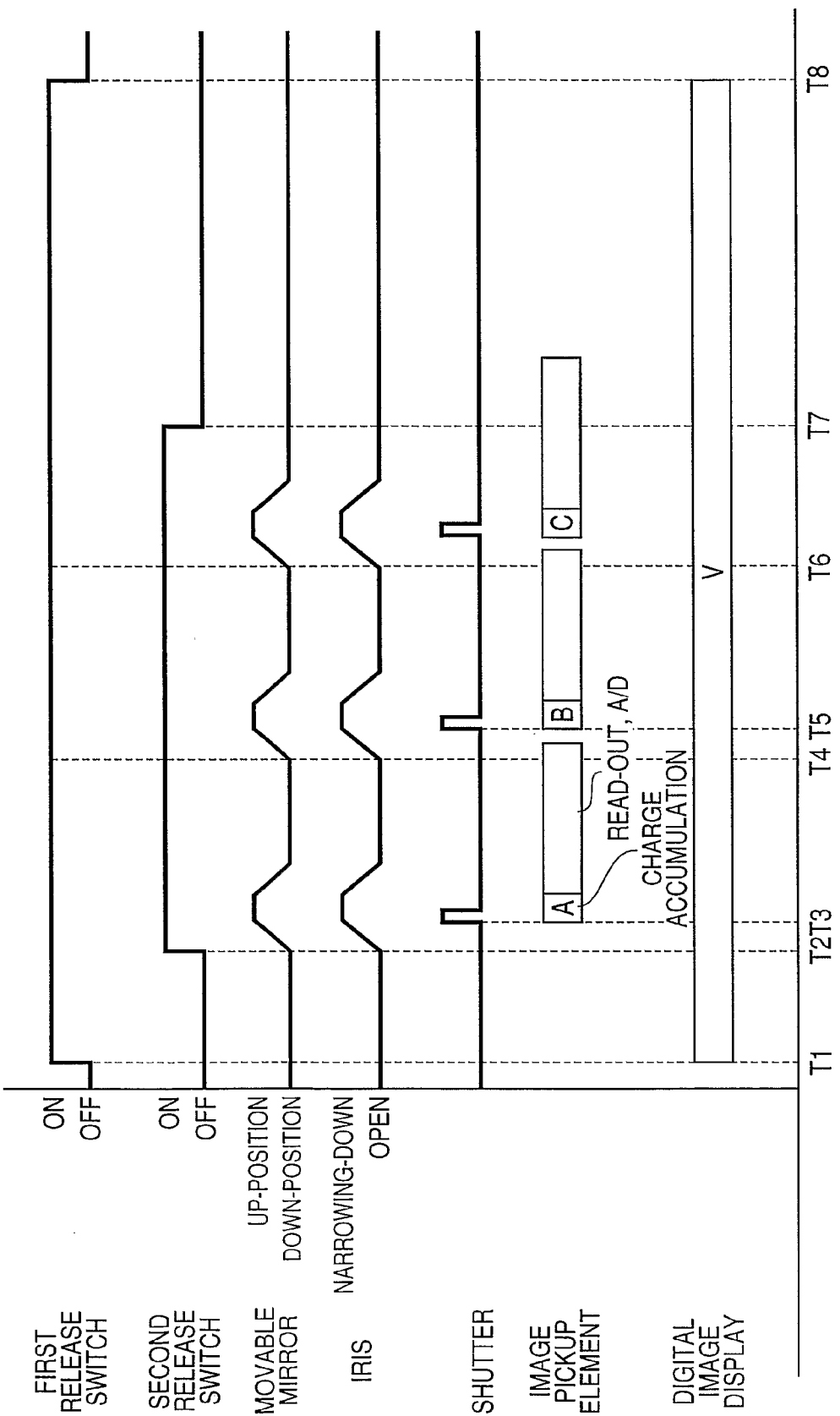
FIG. 24 is a timing chart illustrating a camera operation based on an operational sequence of the CPU 141.

FIG. 24 is a timing chart showing a camera operation based on an operational sequence of the CPU 141. Here, the case where half depression is performed on the release button, and then three frames are photographed by full depression of the release button, followed by half depression on the release button continued for a while is shown.

When the first release switch is switched from off to on at the time T1 first, photometry and the exposure amount calculation is immediately performed. At the same time, the digital television tuner 164 is activated and the television broadcasting is received.

The CPU 141 instructs the signal processing circuit 145 to perform conversion to convert the image data V from the digital television tuner 164 into composite signals. The signal processing circuit 145 converts the image data V into composite signals, supplies the composite signals to the liquid crystal display device 108 and displays the received digital image (video image) V on the LCD 108a. That enables a user to visually check the digital image (video image) on the second display region 190d of the finder device 130.

When the second release switch is switched from off to on at the time T2, the movable mirror 124 moves to the up position, while the iris 122 of the photographing lens 120 is narrowed.

At the time T3, charge accumulation of the image pickup element 127 for an image A starts, while the shutter 126 is opened or closed. When the shutter 126 is closed, the charge accumulation of the image pickup element 127 stops and reading-out and A/D conversion on image signals of the image A are performed. Opening of the iris 122 and moving of the movable mirror 124 to the down position are also performed. When reading and the A/D conversion of the image signal of the image A end, the digital image signals are temporarily stored in the continuous photographing data accumulation region of the SDRAM 148 in order.

As the full depression of the release button is kept and the second release switch is still turned on at the time T4, the movable mirror 124 moves to the up position again, while the iris 122 of the photographing lens 120 is narrowed.

At the time T5, charge accumulation of the image pickup element 127 for the image B starts, while the shutter 126 is opened or closed. When the shutter 126 is closed, the charge accumulation of the image pickup element 127 stops and reading-out and A/D conversion of the image signal are performed. Releasing of the iris 122 and moving of the movable mirror 124 to the down position are also performed. When reading and the A/D conversion of the image signal of the image B end, the digital image signals are temporarily stored in the continuous photographing data accumulation region of the SDRAM 148 in order.

As the full depression of the release button is kept and the second release switch is still turned on at the time T6, operations after the time T5 are repeated and the image C is captured.

As full depression of the release button ends and the second release switch is turned off at the time T7, continuous photographing ends. Reading and A/D conversion of the image C are kept, however.

As half depression of the release button ends and the first release switch is turned off at the time T8, the digital image display to the second display region 190d of the finder device 130 stops. Until the digital image display stops, an image (video image) V of a television image is continuously displayed in the second display region 190d of the finder device 130 from the time T1.

Figure 25:
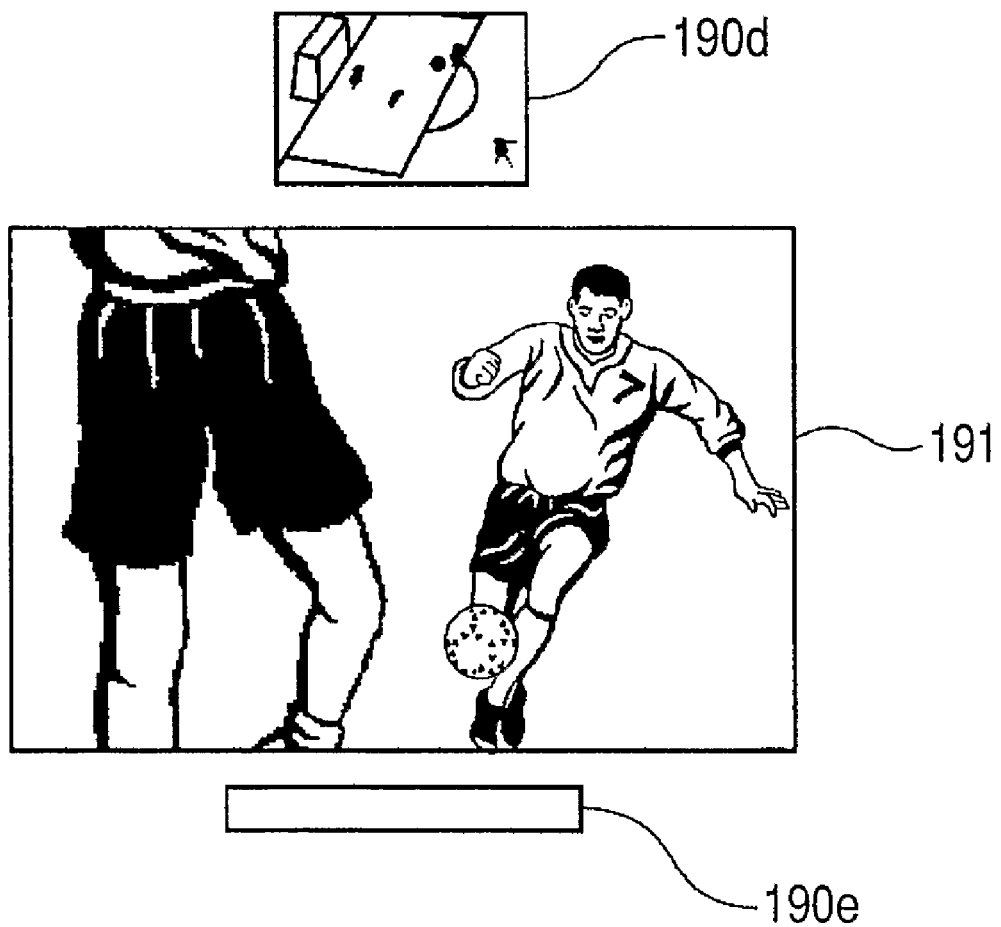
FIG. 25 is a diagram illustrating a display in the field of view of the finder.

FIG. 25 is a diagram showing a display in the field of view of the finder. In the second display region 190d, a video image of a live broadcasting of a sport activity such as a succor is displayed as an image for a television broadcasting. In such a live broadcasting of a sport activity such as a succor, various bird's-eye view images viewed from above the stadium are used so that the audience can easily understand the entire game. On the other hand, a true-to-life dynamic photograph is usually a close-up photograph of a particular user instead of a photograph of the bird's-eye view image of the entire game viewed from above the stadium.

To take such a photograph, the photographing lens 120 with a focal length that matches the distance between an object person and the camera must be selected. It is quite difficult, however, for a user to understand the entire game, while looking into a finder with a shooting magnification to close up a user. That usually requires a user to be experienced to catch a shutter chance.

As such, according to the camera in the sixth embodiment, the user can take a close-up of an object with the photographing lens 120 on the first display region 191, while recognizing the entire image by the image for television broadcasting displayed on the second display region 190d of the finder 130. Therefore, the user can easily take a shutter chance.

The user keeps watching an optical image without needing to take the user's eyes from the finder. Thus, the user does not miss a shutter chance by checking the image capturing auxiliary information such as an image for television broadcasting.

The layout position of the liquid crystal display and what to be displayed on the liquid crystal display as well as a method for distributing optical paths between the finder optical system and the image pickup elements have been described by exemplifying a predetermined combinations in the above-mentioned embodiments. The feature of the present invention is not limited to these, however. For example, EVF may be realized by using a pellicle mirror as in the second embodiment or map information may be displayed as in the fourth embodiment on the display device of the third embodiment in a layout of liquid crystal devices of the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-077555, filed Mar. 23, 2007, which is hereby incorporated by reference herein in its entirety.

The invention claimed is:

1. An image capture apparatus comprising:
   an image pickup element for photoelectrically converting a subject image formed by a photographing lens;
   a finder device for effecting display such that a first display region on which the subject image is observed as an optical image and a second display region on which a digital image that is photoelectrically converted by the image pickup element and is displayed is observed, can be observed simultaneously through an eyepiece window;
   a display controlling unit for controlling, in response to a photographing preparation instruction provided by a photographing instruction unit, to read out, from a recording medium, a digital image recorded thereon at a previous photographing and display the read-out digital image on the second display region, and then controlling to stop continuing to display the read-out digital image any more on the second display region if a predetermined condition is satisfied; and
   a controlling unit for controlling to perform image processing on the image signal photoelectrically converted by the image pickup element on the basis of a photographing instruction from the photographing instruction unit and controlling the display controlling unit so as to display, on the second display region, a digital image which is subjected to the image processing and to continue to display the digital image which is subjected to the image processing until another image is subjected to the image processing.

2. The image capture apparatus according to claim 1, wherein the display controlling unit controls to display the digital image with information added thereto as a predetermined mark.

3. The image capture apparatus according to claim 1, further comprising a movable mirror that can be freely moved to a first position on which an incident light is reflected toward the finder device and a second position on which the incident light is formed on the image pickup element, and a mirror driving circuit for driving the movable mirror,
   wherein the mirror driving circuit moves the movable mirror to the second position when an image is captured.

4. The image capture apparatus according to claim 1, further comprising a pellicle mirror for dividing an optical path of the incident light so as to reflect the incident light to direct the incident light to the finder device, while transmitting the incident light to be formed on the image pickup element.

5. The image capture apparatus according to claim 1, further comprising a beam splitter for dividing an optical path of the incident light so as to reflect a visible light included in the incident light to direct the incident light to the finder device, while transmitting an infrared light included in the incident light to be formed on the image pickup element.

6. The image capture apparatus according to claim 1, further comprising an obtaining unit for obtaining a digital image captured by another image capture apparatus,
   wherein when a digital image that is photoelectrically converted by the image pickup element is not displayed, the display controlling unit displays a digital image obtained by the obtaining unit.

7. The image capture apparatus according to claim 1, further comprising an obtaining unit for obtaining map information, wherein when a digital image that is photoelectrically converted by the image pickup element is not displayed, the display controlling unit displays map information obtained by the obtaining unit.

8. The image capture apparatus according to claim 1, further comprising an obtaining unit for obtaining a video image of television broadcast,
   wherein when a digital image that is photoelectrically converted by the image pickup element is not displayed, the display controlling unit displays the video image obtained by the obtaining unit.

9. The image capture apparatus according to claim 1, wherein the predetermined condition is that the photographing instruction unit stops providing the photographing preparation instruction.

10. The image capture apparatus according to claim 1, further comprising an exposure controlling unit for controlling an exposure in response to the photographing preparation instruction provided by the photographing instruction unit.

11. The image capture apparatus according to claim 1, wherein the display controlling unit controls to display the digital image such that a color component of the digital image to be displayed is shifted in advance by a amount corresponding to a position difference caused by color dispersion which occurs when a corresponding color component of light of the subject image is refracted in a prism that constructs the finder device.

* * * * *